US009820147B2

(12) United States Patent
Hwang et al.

(10) Patent No.: US 9,820,147 B2
(45) Date of Patent: Nov. 14, 2017

(54) AUTHENTIFICATION METHOD FOR A COMMUNICATION NETWORK

(71) Applicant: NATIONAL CHENG KUNG UNIVERSITY, Tainan (TW)

(72) Inventors: Tzone-Lih Hwang, Tainan (TW); Prosanta Gope, Tainan (TW)

(73) Assignee: National Cheng Kung University, Tainan (TW)

( * ) Notice: Subject to any disclaimer, the term of this patent is extended or adjusted under 35 U.S.C. 154(b) by 124 days.

(21) Appl. No.: 14/857,619

(22) Filed: Sep. 17, 2015

(65) Prior Publication Data

US 2016/0080939 A1    Mar. 17, 2016

(30) Foreign Application Priority Data

Sep. 17, 2014    (TW) .............................. 103132101 A

(51) Int. Cl.
*H04L 29/06*        (2006.01)
*H04W 12/06*        (2009.01)
*H04W 12/04*        (2009.01)
*H04L 9/32*         (2006.01)
(Continued)

(52) U.S. Cl.
CPC ........... *H04W 12/06* (2013.01); *H04L 9/0822* (2013.01); *H04L 9/0827* (2013.01); *H04L 9/0844* (2013.01); *H04L 9/3226* (2013.01); *H04L 9/3236* (2013.01); *H04L 9/3273* (2013.01); *H04L 63/123* (2013.01);
(Continued)

(58) Field of Classification Search
CPC ... H04L 9/0822; H04L 9/0827; H04L 9/0844; H04L 9/3226; H04L 9/3273; H04L 9/3236; H04L 63/123; H04L 2209/80; H04L 2209/42; H04W 12/06; H04W 12/04; H04W 76/007
See application file for complete search history.

(56) References Cited

U.S. PATENT DOCUMENTS 5,757,916 A * 5/1998 MacDoran ............ G01S 19/215
                                                342/357.48
7,418,596 B1 * 8/2008 Carroll .................. H04L 63/068
                                                380/247
(Continued)

FOREIGN PATENT DOCUMENTS

TW           I390938 B        3/2013

*Primary Examiner* — Don Zhao
(74) *Attorney, Agent, or Firm* — Rosenberg, Klein & Lee

(57) ABSTRACT

An authentication method for a communication network includes a registration step, an inquiry step, an answering step and a verification step. The authentication method further includes an emergency authentication mode if a response code is not received by a requesting end within a predetermined period of time or if a first confirmation code is verified to be incorrect by a requesting end. In another embodiment, an authentication method for a communication network includes a registration step, a first inquiry step, a second inquiry step, a first answering step, a second answering step and a verification step. The authentication method in the other embodiment also includes an emergency authentication mode if a second response code is not received by the requesting end within a predetermined period of time or if a third tested code is verified to be incorrect.

8 Claims, 8 Drawing Sheets

(51) Int. Cl.
*H04L 9/08* (2006.01)
*H04W 76/00* (2009.01)

(52) U.S. Cl.
CPC ......... *H04W 12/04* (2013.01); *H04L 2209/42* (2013.01); *H04L 2209/80* (2013.01); *H04W 76/007* (2013.01)

(56) References Cited

U.S. PATENT DOCUMENTS

| | | | | |
|---|---|---|---|---|
| 9,021,265 | B1* | 4/2015 | Chen | H04L 9/0844 713/169 |
| 9,246,686 | B1* | 1/2016 | Holland | H04L 9/3236 |
| 2003/0067921 | A1* | 4/2003 | Sivalingham | H04L 63/0838 370/394 |
| 2004/0187018 | A1* | 9/2004 | Owen | G06F 21/31 713/184 |
| 2004/0202329 | A1* | 10/2004 | Jung | H04L 63/0428 380/273 |
| 2008/0184031 | A1* | 7/2008 | McGough | H04L 63/062 713/171 |
| 2008/0301466 | A1 | 12/2008 | Hsu et al. | |
| 2011/0265159 | A1* | 10/2011 | Ronda | H04L 63/0853 726/6 |
| 2012/0072228 | A1* | 3/2012 | Pankajakshan | G06Q 30/0241 705/1.1 |
| 2012/0072353 | A1* | 3/2012 | Boone | G06Q 20/10 705/64 |
| 2012/0087493 | A1* | 4/2012 | Chidambaram | H04L 9/0841 380/44 |
| 2012/0124656 | A1* | 5/2012 | Senac | H04L 9/3213 726/9 |
| 2012/0159591 | A1* | 6/2012 | Payne | G06F 21/35 726/7 |
| 2012/0210127 | A1* | 8/2012 | Kameda | G06F 21/31 713/168 |
| 2015/0295919 | A1* | 10/2015 | Van Kerrebroeck | H04L 63/0853 726/9 |
| 2016/0065550 | A1* | 3/2016 | Kanov | H04L 63/08 726/7 |
| 2016/0127341 | A1* | 5/2016 | Yan | H04L 63/0407 726/9 |

* cited by examiner

AUTHENTIFICATION METHOD FOR A COMMUNICATION NETWORK

CROSS REFERENCE TO RELATED APPLICATIONS

The application claims the benefit of Taiwan application serial No. 103132101, filed on Sep. 17, 2014, the subject matter of which is incorporated herein by reference.

BACKGROUND OF THE INVENTION

1. Field of the Invention

The present invention generally relates to an authentication method and, more particularly, to an authentication method for a communication network.

2. Description of the Related Art

In the communication protocols, the authentication mechanism has been a very important issue for verifying the identity of the user. In the modern bidirectional authentication system, synchronous or asynchronous encryption/decryption methods are often used, such as AES-CBC, ECIES, Diffie-Hellman, Chinese remainder theorem, etc. These algorithms require complex computations to ensure the safety of the communication systems.

For example, the involved parties of the authentication process are able to acquire the required authentication data via the public key encryption. Such an example may be seen in Taiwan Patent No. 1390938 entitled "Authentication apparatuses and verification methods." The verification methods can be used to verify the programs in a computer.

However, the verification methods require a large amount of resources for computations. Therefore, some devices with low computation capability, such as wireless detectors, smart phones or tablets, are not able to properly execute the verification methods.

SUMMARY OF THE INVENTION

It is therefore the objective of this invention to provide a novel authentication method that can be used in any electronic device with low computational capability.

In an embodiment, an authentication method for a communication network includes a registration step, an inquiry step, an answering step and a verification step. The registration step includes transmitting a registration request to a receiving end by a requesting end; and transmitting an identification code, a request key, a preliminary registration code, a set of pseudo identification codes and a set of emergency keys to the requesting end, as performed by the receiving end. The set of pseudo identification codes includes a plurality of pseudo identification codes, and the set of emergency keys includes a plurality of emergency keys. One of the plurality of emergency keys of the set of emergency keys corresponds to one of the plurality of pseudo identification codes of the set of pseudo identification codes. The inquiry step is performed by the requesting end and includes generating a first arbitrary code having a predetermined value; performing an XOR operation between the first arbitrary code and the request key to generate a calculated code; setting a value of a hash function of a combined data of the identification code, the request key, the first arbitrary code and the preliminary registration code as a verification code; combining the verification code, the calculated code and the preliminary registration code as a request code; and transmitting the request code to the receiving end. In the answering step, if the preliminary registration code is verified to be correct by the receiving end, the receiving end performs an XOR operation between the request key and the calculated code to generate a second arbitrary code having the predetermined value; verifies the verification code with a determined value of the hash function of a combined data of the identification code, the request key, the second arbitrary code and the preliminary registration code; generates a first authentication key after the verification code is verified to be correct; performs an XOR operation between the first authentication key and a value of the hash function of a combined data of the request key, the identification code and the preliminary registration code to generate a calculated verification code; increases a value of a variable by an increment; sets the value of the variable as a first new registration code; performs an XOR operation between the first new registration code and a value of the hash function of a combined data of the request key, the identification code and the second arbitrary code to generate a final registration code; sets a value of the hash function of a combined data of the calculated verification code, the second arbitrary code, the final registration code, the request key and the identification code as a first confirmation code; sets a value of the hash function of a combined data of the request key, the identification code and the first new registration code as a first new request key; updates the request key with the first new request key; combines the calculated verification code, the first confirmation code and the final registration code as a response code; and transmits the response code to the requesting end. In the verification step, if the first confirmation code is verified to be correct using a determined value of the hash function of a combined data of the calculated verification code, the first arbitrary code, the final registration code, the request key and the identification code, the requesting end performs an XOR operation between the calculated verification code and a value of the hash function of a combined data of the request key, the identification code and the preliminary registration code to generate a second authentication key; performs an XOR operation between the final registration code and a value of the hash function of a combined data of the request key, the identification code and the first arbitrary code to generate a second new registration code; sets the value of the hash function of a combined data of the request key, the identification code and the second new registration code as a second new request key; updates the preliminary registration code with the second new registration code; and updates the request key with the second new request key.

In a form shown, the authentication method further includes an emergency authentication mode if the response code is not received by the requesting end within a predetermined period of time or if the first confirmation code is verified to be incorrect by the requesting end. The emergency authentication mode includes an emergency inquiry step, an emergency answering step and an emergency verification step. In the emergency inquiry step, the requesting end generates a first arbitrary emergency code having a preset value; sets another one of the plurality of pseudo identification codes of the set of pseudo identification codes as an one-time alias identity; sets another one of the plurality of emergency keys of the set of emergency keys as the request key; performs an XOR operation between the request key and the first arbitrary emergency code to generate a calculated emergency code; combines the one-time alias identity and the calculated emergency code as an emergency request code; and transmits the emergency request code to the receiving end. In the emergency answering step, if the one-time alias identity is verified to contain the other one of the plurality of pseudo identification codes and if the other one of the plurality of emergency keys is verified to be in correspondence to the other one of the plurality of pseudo identification codes, the receiving end sets the other one of the plurality of emergency keys as the request key; performs an XOR operation between the request key and the calculated emergency code to generate a second arbitrary emergency code having the preset value; generates a first secret authentication key; performs an XOR operation between the first secret authentication key and a value of the hash function of a combined data of the request key and the identification code to generate a calculated emergency verification code; increases the value of the variable by the increment; sets the value of the variable as a first new emergency registration code; performs an XOR operation between the first new emergency registration code and a value of the hash function of a combined data of the request key, the identification code and the secondary arbitrary emergency code to generate a final emergency registration code; sets a value of the hash function of a combined data of the calculated emergency verification code, the secondary arbitrary emergency code, the final emergency registration code, the request key and the identification code as a first emergency confirmation code; generates a first new emergency request key; performs an XOR operation between the first new emergency request key and a value of the hash function of a combined data of the identification code and the other one of the plurality of emergency keys to generate an emergency registration code; updates the request key with the first new emergency request key; combines the calculated emergency verification code, the first emergency confirmation code, the final emergency registration code and the emergency registration code as an emergency response code; and transmits the emergency response code to the requesting end. In the emergency verification step S4', if the first emergency confirmation code is verified to be correct using a determined value of the hash function of a combined data of the calculated emergency verification code, the first arbitrary emergency code, the final emergency registration code, the request key and the identification code, the requesting end performs an XOR operation between the calculated emergency verification code and a value of the hash function of a combined data of the request key, the identification code and the preliminary registration code to generate a second secret authentication key; performs an XOR operation between the final emergency registration code and a value of the hash function of a combined data of the request key, the identification code and the first arbitrary emergency code to generate a second new emergency registration code; performs an XOR operation between the emergency registration code and a value of the hash function of a combined data of the identification code and the other one of the plurality of emergency keys to generate a second new emergency request key; updates the request key with the second new emergency request key; and updates the preliminary registration code with the second new emergency registration code.

In the form shown, the identification code is a communication key, a signature, a certificate or a license.

In another authentication method, an authentication method for a communication network includes a registration step, a first inquiry step, a second inquiry step, a first answering step, a second answering step and a verification step. The registration step includes transmitting a registration request to a receiving end by a requesting end. Then, the receiving end transmits a first identification code, a request key, a preliminary registration code, a set of pseudo identification codes and a set of emergency keys to the requesting end. The set of pseudo identification codes includes a plurality of pseudo identification codes, and the set of emergency keys includes a plurality of emergency keys. One of the plurality of emergency keys of the set of emergency keys corresponds to one of the plurality of pseudo identification codes of the set of pseudo identification codes. Then, the receiving end transmits a second identification code and an inquiry key to an inquiry end. In the first inquiry step, the requesting end generates a first arbitrary code having a first predetermined value; performs an XOR operation between the first arbitrary code and the request key to generate a first calculated code; sets a value of a hash function of a combined data of the first identification code, the request key, the first arbitrary code and the preliminary registration code as a verification code; combines the verification code, the first calculated code and the preliminary registration code as a first request code; and transmits the first request code to an inquiry end. In the second inquiry step, the inquiry end generates a second arbitrary code having a second predetermined value; performs an XOR operation between the second arbitrary code and the inquiry key to generate a second calculated code; sets a value of a hash function of a combined data of the first request code, the inquiry key, the second arbitrary code and the second identification code as a first tested code; combines the first request code, the second identification code, the first tested code and the second calculated code as a second request code; and transmits the second request code to the receiving end. In the first answering step, if the preliminary registration code is verified to be correct by the receiving end, the receiving end performs an XOR operation between the request key and the first calculated code to generate a third arbitrary code having the first predetermined value of the first arbitrary code; performs an XOR operation between the inquiry key and the second calculated code to generate a fourth arbitrary code having the second predetermined value of the second arbitrary code; verifies the first tested code with a determined value of the hash function of a combined data of the first request code, the inquiry key, the fourth arbitrary code and the second identification code; verifies the verification code with a determined value of the hash function of a combined data of the first identification code, the request key, the third arbitrary code and the preliminary registration code. In the first answering step, if both the first tested code and the verification code are verified to be correct, the receiving end generates a first authentication key; performs an XOR operation between the first authentication key and a value of the hash function of a combined data of the request key, the first identification code and the preliminary registration code to generate a first calculated verification code; performs an XOR operation between the first authentication key and a value of the hash function of a combined data of the inquiry key and the fourth arbitrary code to generate a second calculated verification code; sets a value of the hash function of a combined data of the second calculated verification code, the fourth arbitrary code, the inquiry key and the second identification code as a second tested code; increases a value of a variable by an increment; sets the value of the variable as a first new registration code; performs an XOR operation between the first new registration code and a value of the hash function of a combined data of the request key, the first identification code and the third arbitrary code to generate a final registration code; sets a value of the hash function of a combined data of the first calculated verification code, the third arbitrary code, the final registration code, the request key and the first identification code as a third tested code; sets a value of the hash function of a combined data of the inquiry key, the fourth arbitrary code and the second identification code as a first new inquiry key; updates the inquiry key with the first new inquiry key; sets a value of the hash function of a combined data of the request key, the first identification code and the first new registration code as a first new request key; updates the request key with the first new request key; combines the first calculated verification code, the second calculated verification code, the second tested code, the third tested code and the final registration code as a first response code; and transmits the first response code to the inquiry end. In the second answering step, if the second tested code is verified to be correct using a determined value of the hash function of a combined data of the second calculated verification code, the second arbitrary code, the inquiry key and the second identification code, the inquiry end performs an XOR operation between the second calculated verification code and a value of the hash function of a combined data of the inquiry key and the second arbitrary code to generate a second authentication key; sets a value of the hash function of a combined data of the inquiry key, the second arbitrary code and the second identification code as a second new inquiry key; updates the inquiry key with the second new inquiry key; combines the first calculated verification code, the third tested code and the final registration code as a second response code; and transmits the second response code to the requesting end. In the verification step, if the third tested code is verified to be correct using a determined value of the hash function of a combined data of the first calculated verification code, the first arbitrary code, the final registration code, the request key and the first identification code, the requesting end performs an XOR operation between the first calculated verification code and a value of the hash function of a combined data of the request key, the first identification code and the preliminary registration code to generate a third authentication key; performs an XOR operation between the final registration code and a value of the hash function of a combined data of the request key, the first identification code and the first arbitrary code to generate a second new registration code; sets a value of the hash function of a combined data of the request key, the first identification code and the second new registration code as a second new request key; updates the preliminary registration code with the second new registration code; and updates the request key with the second new request key.

In a form shown, the authentication method further includes an emergency authentication mode if the second response code is not received by the requesting end within a predetermined period of time or if the third tested code is verified to be incorrect. The emergency authentication mode includes a first emergency inquiry step, a second emergency inquiry step, a first emergency answering step, a second emergency answering step and an emergency verification step. In the first emergency inquiry step, the requesting end generates a first arbitrary emergency code having a first preset value; sets another one of the plurality of pseudo identification codes of the set of pseudo identification codes as an one-time alias identity; sets another one of the plurality of emergency keys of the set of emergency keys as the request key; performs an XOR operation between the request key and the first arbitrary emergency code to generate a first calculated emergency code; combines the one-time alias identity and the first calculated emergency code as a first emergency request code; and transmits a first emergency request code to the inquiry end. In the second emergency inquiry step, the inquiry end generates a second arbitrary emergency code having a second present value; performs an XOR operation between the second arbitrary emergency code and the inquiry key to generate a second calculated emergency code; sets a value of the hash function of a combined data of the first emergency request code, the inquiry key, the second arbitrary emergency code and the second identification code as a first emergency tested code; combines the first emergency request code, the second identification code, the first emergency tested code and the second calculated emergency code as a second emergency request code; and transmits the second emergency request code to the receiving end. In the first emergency answering step, the receiving end performs an XOR operation between the request key and the first calculated emergency code to generate a third arbitrary emergency code having the first preset value of the first arbitrary emergency code; performs an XOR operation between the inquiry key and the second calculated emergency code to generate a fourth arbitrary emergency code having the second present value of the second arbitrary emergency code; and verifies the first emergency tested code with a determined value of the hash function of a combined data of the first emergency request code, the inquiry key, the fourth arbitrary emergency code and the second identification code. If the one-time alias identity (eAID$_A$) is verified to contain the other one of the plurality of pseudo identification codes (pid$_j$) and if the first emergency tested code (eV$_1$') is verified to be correct, the first emergency answering step (P3a') further generates a first secret authentication key; performs an XOR operation between the first secret authentication key and a value of the hash function of a combined data of the request key and the first identification code to generate a first calculated emergency verification code; performs an XOR operation between the first secret authentication key and a value of the hash function of a combined data of the inquiry key and the fourth arbitrary emergency code to generate a second calculated emergency verification code; sets a value of the hash function of a combined data of the second calculated emergency verification code, the fourth arbitrary emergency code, the inquiry key and the second identification code as a second emergency tested code; increases the value of the variable by the increment; sets the value of the variable as a first new emergency registration code; performs an XOR operation between the first new emergency registration code and a value of the hash function of a combined data of the request key, the first identification code and the third arbitrary emergency code to generate a final emergency registration code; sets a value of the hash function of a combined data of the first calculated emergency verification code, the third arbitrary emergency code, the final emergency registration code, the request key and the first identification code as a third emergency tested code; sets a value of the hash function of a combined data of the inquiry key, the fourth arbitrary emergency code and the second identification code as a first new emergency inquiry key; generates a first new emergency request key; performs an XOR operation between the first new emergency request key and a value of the hash function of a combined data of the identification code and the request key to generate an emergency registration code; updates the request key with the first new emergency request key; combines the first calculated emergency verification code, the second calculated emergency verification code, the second emergency tested code, the third emergency tested code, the final emergency registration code and the emergency registration code as a first emergency response code; and transmits the first emergency response code to the inquiry end. In the second emergency answering step, if the second emergency tested code is verified to be correct using a determined value of the hash function of a combined data of the second calculated emergency verification code ($eN_{y1}'$), the second arbitrary emergency code, the inquiry key and the second identification code, the inquiry end performs an XOR operation between the second calculated emergency verification code and a value of the hash function of a combined data of the inquiry key and the second arbitrary emergency code to generate a second secret authentication key; sets a value of the hash function of a combined data of the inquiry key, the second arbitrary emergency code and the second identification code as a second new emergency inquiry key; updates the inquiry key with the second new emergency inquiry key; combines the first calculated emergency verification code, the third emergency tested code and the final emergency registration code as a second emergency response code; and transmits the second emergency response code to the requesting end. In the emergency verification step, if the third emergency tested code is verified to be correct using a determined value of the hash function of a combined data of the first calculated emergency verification code, the first arbitrary emergency code, the final emergency registration code, the request key and the identification code, the requesting end performs an XOR operation between the first calculated emergency verification code and a value of the hash function of a combined data of the request key and the identification code to generate a third secret authentication key; performs an XOR operation between the final emergency registration code and a value of the hash function of a combined data of the request key, the identification code and the first arbitrary emergency code to generate a second new emergency registration code; performs an XOR operation between the emergency registration code and a value of the hash function of a combined data of the identification code and the request key to generate a second new emergency request key; updates the request key with the second new emergency request key; and updates the preliminary registration code with the second new emergency registration code.

In the form shown, each of the first identification code and the second identification code is a communication key, a signature, a certificate or a license.

In the form shown, the preliminary registration code is a series of numbers arranged in a descending or ascending order.

In the form shown, the pseudo identification code is a random number of a timestamp.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
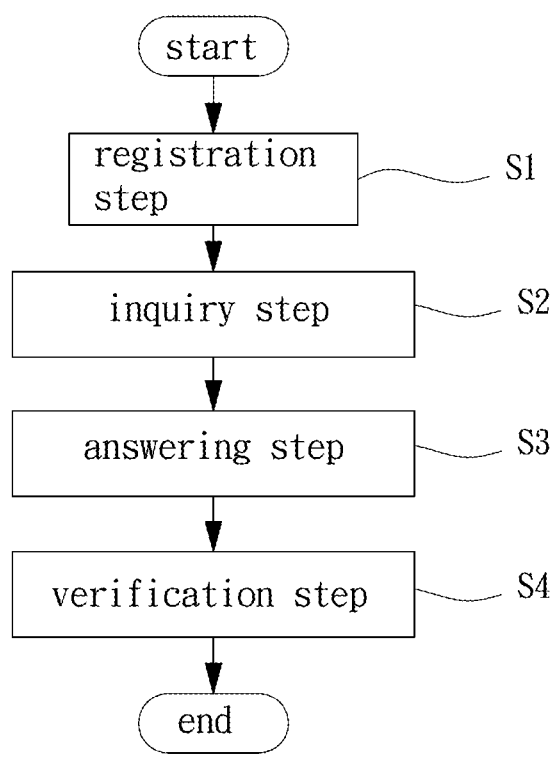
FIG. 1 shows a flowchart of an authentication method for a communication network according to a first embodiment of the invention.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

FIG. 1 shows an authentication method for a communication network according to a first embodiment of the invention. In the embodiment, the authentication method is performed in a wireless communication network having a user end (which is labeled as 1 in FIG. 2) and a server end (which is labeled as 2 in FIG. 2). The authentication method includes a registration step S1, an inquiry step S2, an answering step S3 and a verification step S4.

In the registration step S1, the user end (requesting end) sends a registration request to the server end (receiving end). Upon the receipt of the registration request, the server end sends an identification code ($SID_A$), a request key ($K_A$), a preliminary registration code ($Ts_a$), a set of pseudo identification codes (PID) and a set of emergency keys ($K_{em}$) to the user end. The set of pseudo identification codes (PID) includes a plurality of pseudo identification codes ($pid_j$), and the set of emergency keys ($K_{em}$) includes a plurality of emergency keys ($K_{em}$). In this regard, one of the plurality of emergency keys ($K_{em}$) corresponds to one of the plurality of pseudo identification codes ($pid_j$) of the set of pseudo identification codes (PID). Now, the registration step S1 is completed and the user end will proceed to acquire the data from the server end that is needed for the authentication purpose.

Figure 2:
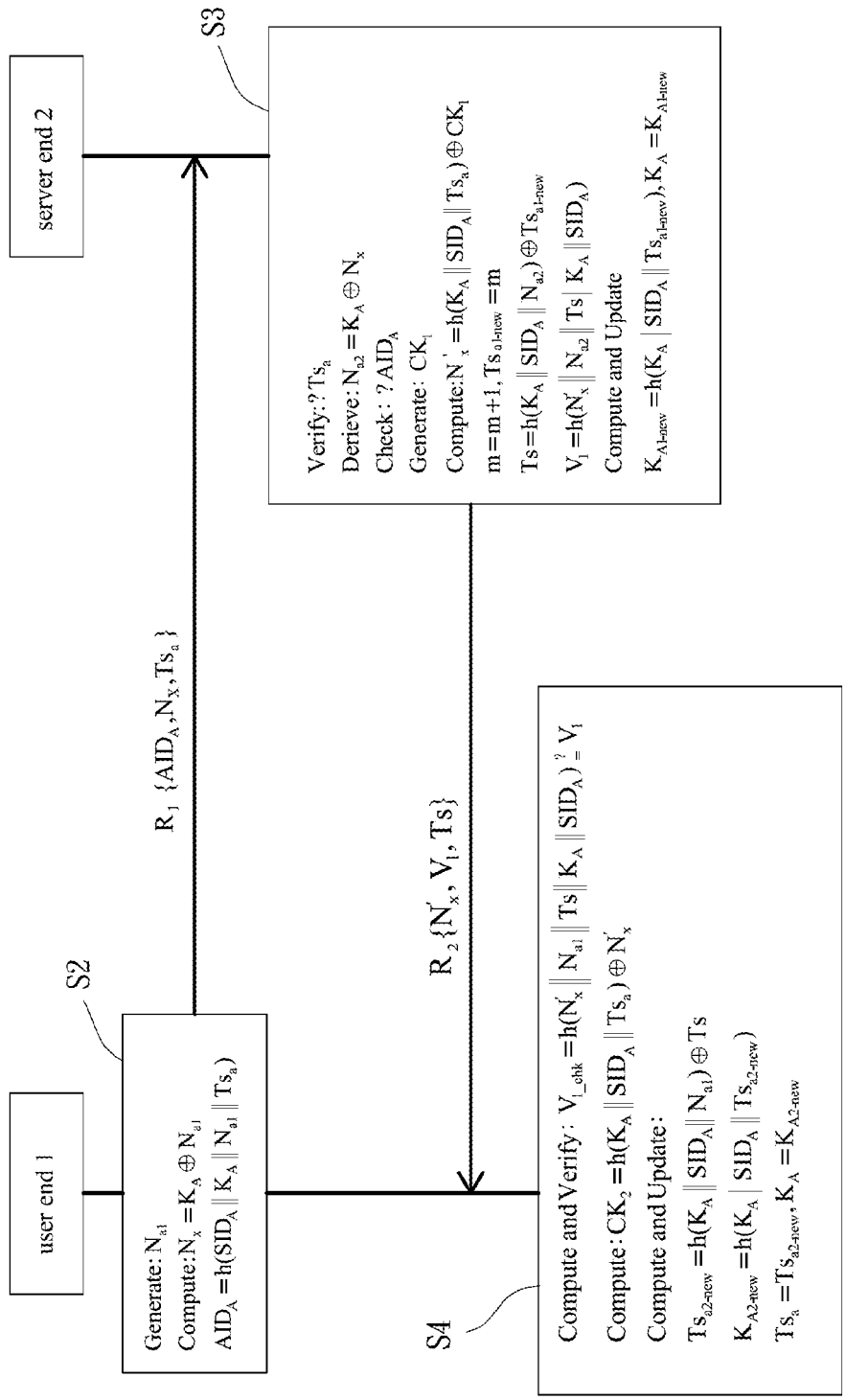
FIG. 2 shows an algorithm diagram of the authentication method in FIG. 1.

In the inquiry step S2, with reference made to FIG. 2, the user end 1 performs the following steps as shown below:

Generate: $N_{a1}$
Compute: $N_x = K_A \oplus N_{a1}$
$AID_A = h(SID_A \| K_A \| N_{a1} \| Ts_a)$ First, the user end 1 generates a first arbitrary code ($N_{a1}$) having a predetermined value. The first arbitrary code ($N_{a1}$) can be any code that is generated in a random manner. Then, the user end 1 performs an XOR (exclusive or) operation between the first arbitrary code ($N_{a1}$) and the request key ($K_A$) to generate a calculated code ($N_x$). The identification code ($SID_A$), the request key ($K_A$), the first arbitrary code ($N_{a1}$) and the preliminary registration code ($Ts_a$) are cascaded as a combined data, and the user end 1 sets the value of a hash function of the combined data as a verification code ($AID_A$). Next, the user end 1 combines the verification code ($AID_A$), the calculated code ($N_x$) and the preliminary registration code ($Ts_a$) as a request code ($R_1$). Finally, the user end 1 sends the request code ($R_1$) to the server end 2.

In the answering step S3, with reference made to FIG. 2 also, upon the receipt of the request code ($R_1$), the server end 2 performs the following steps as shown below:

Verify: ?$Ts_a$
Derive: $N_{a2}=K_A \oplus N_x$
Check: ?$AID_A$
Generate: $CK_1$
Compute: $N_x'=h(K_A\|SID_A\|Ts_a) \oplus CK_1$
$m=m+1$, $Ts_{a1\text{-}new}=m$.
$Ts=h(K_A\|SID_A\|N_{a2}) \oplus Ts_{a1\text{-}new}$
$V_1=h(N_x\|N_{a2}\|Ts\|K_A\|SID_A)$
Compute and Update:
$K_{A1\text{-}new}=h(K_A\|SID_A\|Ts_{a1\text{-}new})$, $K_A=K_{A1\text{-}new}$ First, the server end 2 verifies the preliminary registration code ($Ts_a$). Since the preliminary registration code ($Ts_a$) was previously sent to the user end 1 by the server end 2, if the preliminary registration code ($Ts_a$) is not correct, the user end 1 and the server end 2 may be no longer in synchronization. In this regard, the server end 2 will ask the user end 1 to try another pseudo identification code ($pid_j$) and another emergency key ($K_{em}$), and then terminates the connection. If the preliminary registration code ($Ts_a$) is verified to be correct, the server end 2 performs an XOR operation between the request key ($K_A$) and the calculated code ($N_x$) to generate a second arbitrary code ($N_{a2}$) that is supposed to have the predetermined value of the first arbitrary code ($N_{a1}$). The identification code ($SID_A$), the request key ($K_A$), the second arbitrary code ($N_{a2}$) and the preliminary registration code ($Ts_a$) are cascaded as a combined data, and the server end 2 determines the value of the hash function of the combined data. At this point, the server end 2 verifies the verification code ($AID_A$) with the determined value of the combined data. If the verification code ($AID_A$) is verified to be correct, the server end 2 generates a first authentication key ($CK_1$). In this regard, the request key ($K_A$), the identification code ($SID_A$) and the preliminary registration code ($Ts_a$) are cascaded as a combined data, and the server end 2 determines the value of the hash function of the combined data. Then, the server end 2 performs an XOR operation between the first authentication key ($CK_1$) and the value of the hash function of the combined data to generate a calculated verification code ($N_x'$). Then, the server end 2 increases the value of a variable (m) by an increment. The increment may be 1, but is not limited thereto. Next, the server end 2 sets the value of the variable (m) as a first new registration code ($Ts_{a1\text{-}new}$). At this point, the request key ($K_A$), the identification code ($SID_A$) and the second arbitrary code ($N_{a2}$) are cascaded as a combined data, and the server end 2 determines the value of the hash function of the combined data. Then, the server end 2 performs an XOR operation between the first new registration code ($Ts_{a1\text{-}new}$) and the determined value of the hash function of the combined data to generate a final registration code (Ts). The calculated verification code ($N_x'$), the second arbitrary code ($N_{a2}$), the final registration code (Ts), the request key ($K_A$) and the identification code ($SID_A$) are cascaded as a combined data, and the server end 2 sets the value of the hash function of the combined data as a first confirmation code ($V_1$). Then, the request key ($K_A$), the identification code ($SID_A$) and the first new registration code ($Ts_{a1\text{-}new}$) are cascaded as a combined data, and the server end 2 sets the value of the hash function of the combined data as a first new request key ($K_{A1\text{-}new}$). Next, the server end 2 updates the request key ($K_A$) with the first new request key ($K_{A1\text{-}new}$), combines the calculated verification code ($N_x'$), the first confirmation code ($V_1$) and the final registration code (Ts) as a response code ($R_2$), and finally sends the response code ($R_2$) to the user end 1.

In the verification step S4, with reference made to FIG. 2 also, upon the receipt of the response code ($R_2$), the user end 1 performs the following steps as shown below:

Compute and Verify: $V_{1\_chk}=h(N_x'\|N_{a1}\|Ts\|K_A\|SID_A)\overset{?}{=}V_1$
Compute: $CK_2=h(K_A\|SID_A\|Ts_a) \oplus N_x'$
Computer and Update:
$Ts_{a2\text{-}new}=h(K_A\|SID_A\|N_a) \oplus Ts$
$K_{A2\text{-}new}=h(K_A\|SID_A\|TS_{a2\text{-}new})$
$Ts_a=Ts_{a2\text{-}new}$, $K_A=K_{A2\text{-}new}$ First, the user end 1 verifies whether the first confirmation code ($V_1$) is correct first. Specifically, the user end 1 determines a value ($V_{1\_chk}$) of the hash function of the combined data of the calculated verification code ($N_x'$), the first arbitrary code ($N_{a1}$), the final registration code (Ts), the request key ($K_A$) and the identification code ($SID_A$), then determines whether the determined value ($V_{1\_chk}$) is consistent with the first confirmation code ($V_1$). If not, the first confirmation code ($V_1$) is verified to be incorrect, and the server end 2 terminates the connection. If the determined result is consistent, the first confirmation code ($V_1$) is verified to be correct. Upon the consistent result, the request key ($K_A$), the identification code ($SID_A$) and the preliminary registration code ($Ts_a$) are cascaded as a combined data, and the user end 1 performs an XOR operation between the calculated verification code ($N_x'$) and the value of the hash function of the combined data to generate a second authentication key ($CK_2$). Then, the request key ($K_A$), the identification code ($SID_A$) and the first arbitrary code ($N_{a1}$) are cascaded as a combined data, and the user end 1 performs an XOR operation between the final registration code (Ts) and the value of the hash function of the combined data to generate a second new registration code ($Ts_{a2\text{-}new}$). Next, the request key ($K_A$), the identification code ($SID_A$) and the second new registration code ($Ts_{a2\text{-}new}$) are cascaded as a combined data, and the user end 1 sets the value of the hash function of the combined data as a second new request key ($K_{A2\text{-}new}$). Finally, the user end 1 updates the preliminary registration code ($Ts_a$) with the second new registration code ($Ts_{a2\text{-}new}$), and updates the request key (KA) with the second new request key ($KA_{2a\text{-}new}$).

In the authentication method of the first embodiment above, the second authentication key ($CK_2$) generated by the user end 1 can be used for authentication purpose with another user end (not shown). Specifically, the server end 2 may send its first authentication key ($CK_1$) to the other user end (not shown) for authentication with the user end 1. In this regard, if the second authentication key ($CK_2$) of the user end 1 is consistent with the first authentication key ($CK_1$) of the other user end (not shown), the authentication will be deemed successful. As such, the two user ends can start to communicate with each other. To the contrary, if the second authentication key ($CK_2$) of the user end 1 is inconsistent with the first authentication key ($CK_1$) of the other user end (not shown), the authentication is not successful. Consequently, the communication between the two user ends cannot be established.

Figure 3:
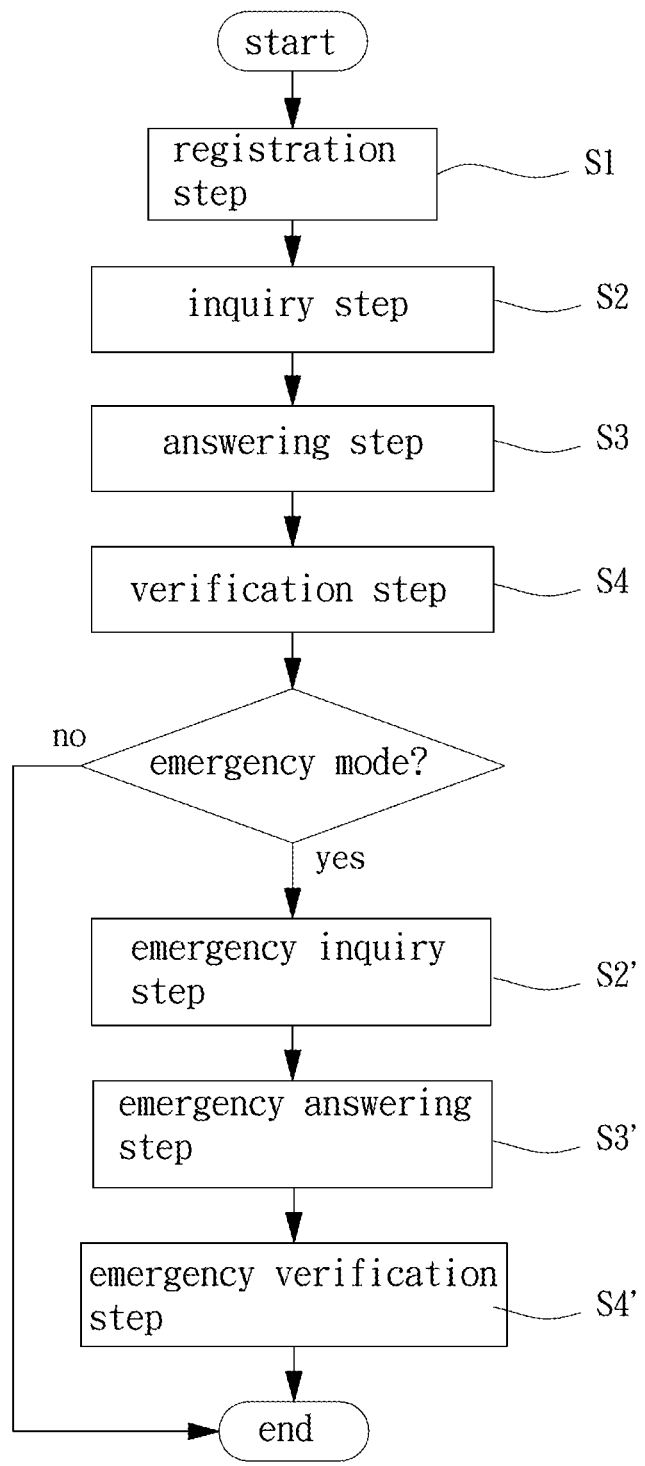
FIG. 3 shows a flowchart of the authentication method for the communication network according to the first embodiment of the invention, with the authentication method includes an emergency authentication mode.

In the first embodiment above, if the response code ($R_2$) generated in the answering step S3 is not received by the user end 1 within a predetermined period of time, or if the response code ($R_2$) is received by the user end 1 but the first confirmation code ($V_1$) is verified to be incorrect in the verification step S4, an emergency authentication mode is executed. The emergency authentication mode includes an emergency inquiry step S2', an emergency answering step S3' and an emergency verification step S4', as shown in FIG. 3.

Figure 4:
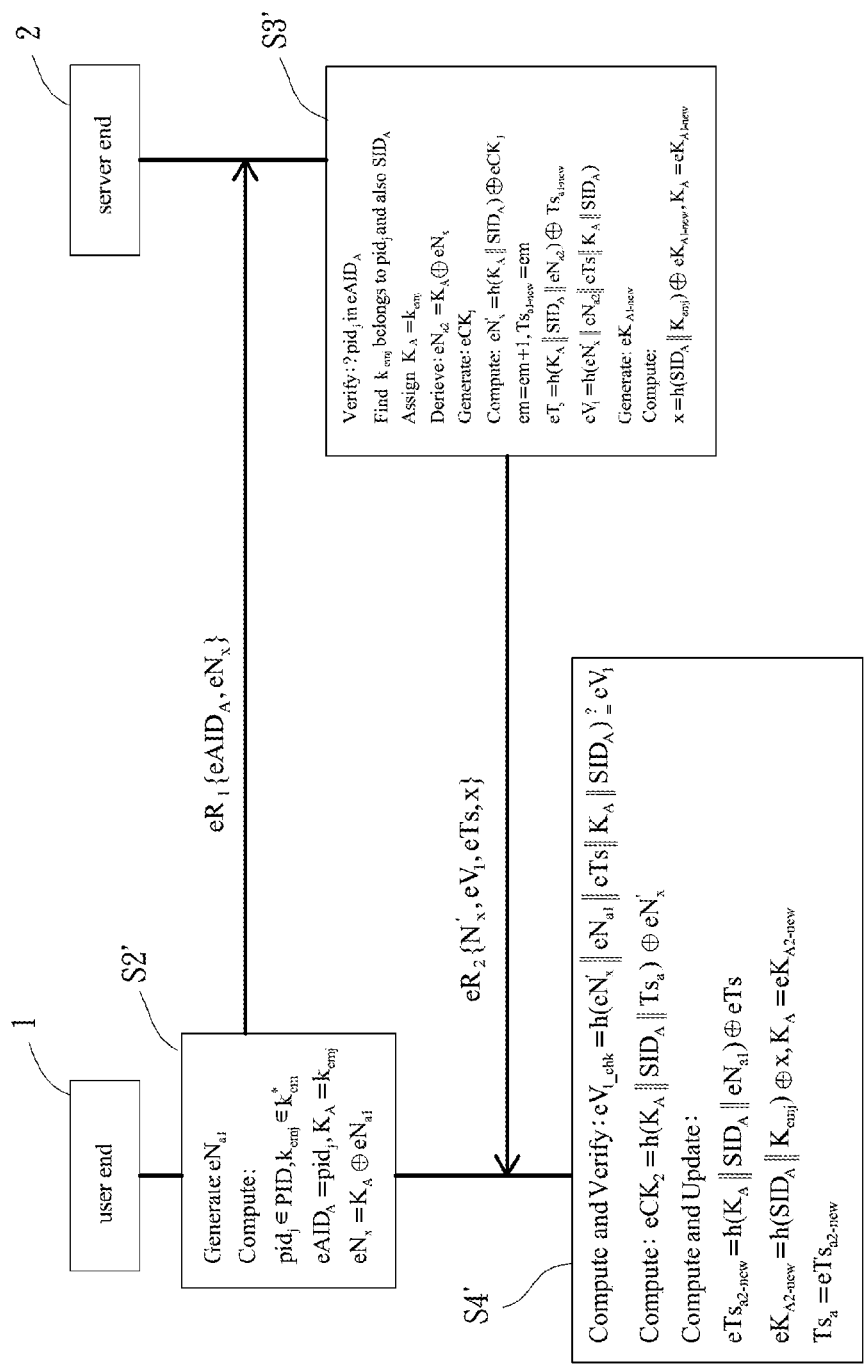
FIG. 4 shows an algorithm diagram of the authentication method in FIG. 3.

In the emergency inquiry step S2', with reference made to FIG. 4, the user end 1 performs the following steps as shown below:

Generate: $eN_{a1}$
Compute:
$pid_j \in PID$, $k_{emj} \in k^*_{em}$.
$eAID_A = pid_j$, $K_A = k_{emj}$
$eN_x = K_A \oplus eN_{a1}$ First, the user end 1 generates a first arbitrary emergency code ($eN_{a1}$) having a preset value, and sets another one of the plurality of pseudo identification codes ($pid_j$) of the set of pseudo identification codes (PID), which has never been used before, as an one-time alias identity ($eAID_A$). The other one of the plurality of pseudo identification codes ($pid_j$) that has never been used before is defined as an unused pseudo identification code ($pid_j$) hereinafter. The user end 1 also sets another one of the plurality of emergency keys ($K_{emj}$) of the set of emergency keys ($K_{em}$), which has never been used before, as the request key ($K_A$). Similarly, the other one of the plurality of emergency keys ($K_{emj}$) that has never been used before is defined as an unused emergency key ($K_{emj}$) hereinafter. Then, the user end 1 performs an XOR operation between the request key ($K_A$) and the first arbitrary emergency code ($eN_{a1}$) to generate a calculated emergency code ($eN_x$), combines the one-time alias identity ($eAID_A$) and the calculated emergency code ($eN_x$) as an emergency request code ($eR_1$), and finally sends the emergency request code ($eR_1$) to the server end (C).

In the emergency answering step S3', with reference made to FIG. 4 also, upon the receipt of the emergency request code ($eR_1$), the server end 2 performs the following steps as shown below:

Verify: ?$pid_j$ in $eAID_A$
Find: $k_{emj}$ belongs to $pid_j$ and also $SID_A$
Assign: $K_A = k_{emj}$
Derive $eN_{a2} = K_A \oplus eN_x$
Generate: $eCK_1$
Computer: $eN_x' = h(K_A \| SID_A) \oplus eCK_1$
$em = em+1$, $Ts_{a1-new} = em$
$eTs = h(K_A \| SID_A \| eN_{a2}) \oplus Ts$
$eV_1 = h(eN_x' \| eN_{a2} \| eTs \| K_A \| SID_A)$
Generate: $eK_{A1-new}$
Compute:
$x = h(SID_A \| K_{emj}) \oplus eK_{A1-new}$, $K_A = eK_{A1-new}$ First, the server end 2 verifies whether the unused pseudo identification code ($pid_j$) is contained in the one-time alias identity ($eAID_A$) and whether the unused emergency key ($K_{emj}$) is in correspondence to the unused pseudo identification code ($pid_j$). If the unused pseudo identification code ($pid_j$) is not contained in the one-time alias identity ($eAID_A$) or if the unused emergency key ($K_{emj}$) is not in correspondence to the unused pseudo identification code ($pid_j$), the server end 2 will ask the user end 1 to try another unused pseudo identification code ($pid_j$) and another unused emergency key ($K_{em}$), and then terminates the connection. If the unused pseudo identification code ($pid_j$) is contained in the one-time alias identity ($eAID_A$) and the unused emergency key ($K_{emj}$) is in correspondence to the unused pseudo identification code ($pid_j$), the server end 2 sets the unused emergency keys ($K_{emj}$) as the request key ($K_A$), performs an XOR operation between the request key ($K_A$) and the calculated emergency code ($eN_x$) to generate a second arbitrary emergency code ($eN_{a2}$) that is supposed to have the preset value of the first arbitrary emergency code ($eN_{a1}$).

Then, the server end 2 generates a first secret authentication key ($eCK_1$). At this point, the request key ($K_A$) and the identification code ($SID_A$) are cascaded as a combined data, and the server end 2 performs an XOR operation between the first secret authentication key ($eCK_1$) and the value of the hash function of the combined data to generate a calculated emergency verification code ($eN_x'$). Then, the server end 2 increases the value of the variable (m) by an increment. The increment may be 1, but is not limited thereto. Next, the server end 2 sets the value of the variable (m) as a first new emergency registration code ($Ts_{a1-new}$). At this point, the request key ($K_A$), the identification code ($SID_A$) and the secondary arbitrary emergency code ($eN_{a2}$) are cascaded as a combined data, and the server end 2 performs an XOR operation between the first new emergency registration code ($eTs_{a1-new}$) and the value of the hash function of the combined data to generate a final emergency registration code ($eTs$). Then, the calculated emergency verification code ($eN_x'$), the secondary arbitrary emergency code ($eN_{a2}$), the final emergency registration code ($eTs$), the request key ($K_A$) and the identification code ($SID_A$) are cascaded as a combined data, and the server end 2 sets the value of the hash function of the combined data as a first emergency confirmation code ($eV_1$). Next, the server end 2 generates a first new emergency request key ($eK_{A1-new}$). Next, the identification code ($SID_A$) and the unused emergency key ($K_{emj}$) are cascaded as a combined data, and the server end 2 performs an XOR operation between the first new emergency request key ($eK_{A1-new}$) and the value of the hash function of the combined data to generate an emergency registration code (x). Finally, the server end 2 updates the request key ($K_A$) with the first new emergency request key ($eK_{A1-new}$), combines the calculated emergency verification code ($eN_x'$), the first emergency confirmation code ($eV_1$), the final emergency registration code ($eTs$) and the emergency registration code (x) as an emergency response code ($eR_2$), and sends the emergency response code ($eR_2$) to the user end 1.

In the emergency verification step S4', with reference made to FIG. 4 also, upon the receipt of the response code ($eR_2$), the user end 1 performs the following steps as shown below:

Compute and Verify: $eV_{1\_chk} = h(eN_x' \| eN_{a1} \| eTs \| K_A \| SID_A)?eV_1$
Compute: $eCK_2 = h(K_A \| SID_A \| Ts_a) \oplus eN_x'$
Compute and Update
$eTs_{a2-new} = h(K_A \| SID_A \| eN_{a1}) \oplus eTs$
$eK_{A2-new} = h(SID_A \| K_{emj}) \oplus x$, $K_A = eK_{A2-new}$
$Ts_a = eTs_{a2-new}$ First, the user end 1 verifies whether the first emergency confirmation code ($eV_1$) is correct first. Specifically, the user end 1 determines a value ($eV_{1\_chk}$) of the hash function of the combined data of the calculated emergency verification code ($eN_x'$), the second arbitrary emergency code ($eN_{a2}$), the final emergency registration code ($eTs$), the request key ($K_A$) and the identification code ($SID_A$), then determines whether the determined value ($eV_{1\_chk}$) is consistent with the first emergency confirmation code ($eV_1$). If not, the first emergency confirmation code ($eV_1$) is verified to be incorrect, and the server end 2 terminates the connection. If the determined result is consistent, the first emergency confirmation code ($eV_1$) is verified to be correct. Upon the consistent result, the request key ($K_A$), the identification code ($SID_A$) and the preliminary registration code ($Ts_a$) are cascaded as a combined data, and the user end 1 performs an XOR operation between the calculated emergency verification code ($eN_x'$) and the value of the hash function of the combined data to generate a second secret authentication key (e$CK_2$). Then, the request key ($K_A$), the identification code ($SID_A$) and the first arbitrary emergency code (e$N_{a1}$) are cascaded as a combined data, and the user end 1 performs an XOR operation between the final emergency registration code (eTs) and the value of the hash function of the combined data to generate a second new emergency registration code (eTs$_{a2\text{-}new}$). Next, the identification code ($SID_A$) and the unused emergency key ($K_{emj}$) are cascaded as a combined data, and the user end 1 performs an XOR operation between the emergency registration code (x) and the value of the hash function of the combined data to generate a second new emergency request key (e$K_{A2\text{-}new}$). Finally, the user end 1 updates the request key ($K_A$) with the second new emergency request key (e$K_{A2\text{-}new}$), and updates the preliminary registration code (Ts$_a$) with the second new emergency registration code (eTs$_{a2\text{-}new}$).

Figure 5:
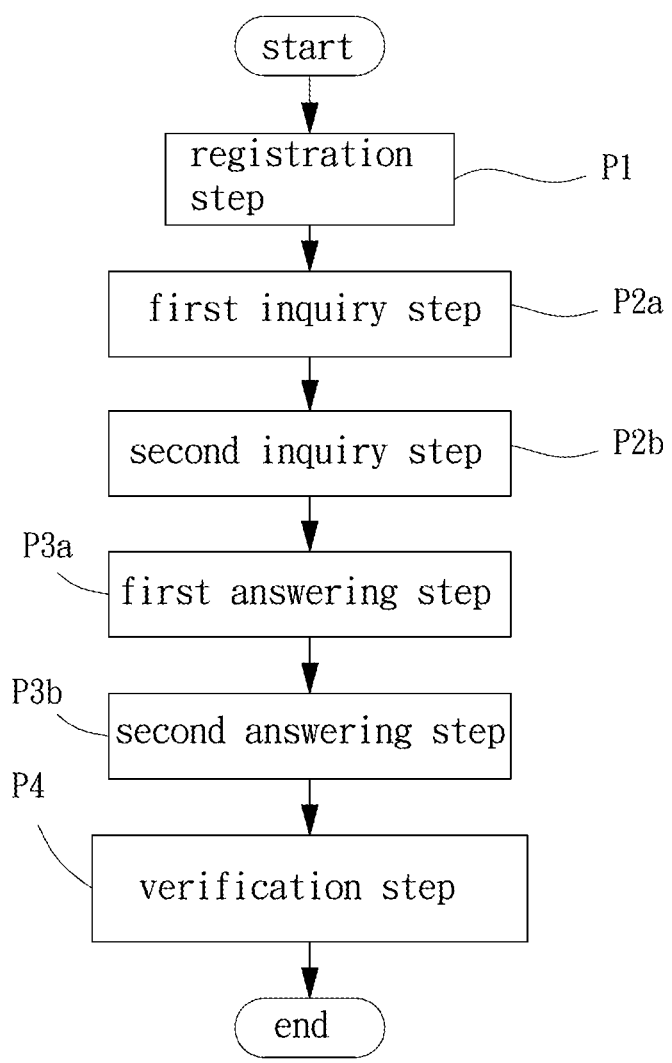
FIG. 5 shows a flowchart of an authentication method for a communication network according to a second embodiment of the invention.

FIG. 5 shows an authentication method for a communication network according to a second embodiment of the invention. In the embodiment, the authentication method is performed in a wireless communication network having a first user end (which is labeled as 1*a* in FIG. 6), a second user end (which is labeled as 1*b* in FIG. 6) and a server end (which is labeled as 2 in FIG. 6). The authentication method includes a registration step P1, a first inquiry step P2*a*, a second inquiry step P2*b*, a first answering step P3*a*, a second answering step P3*b* and a verification step P4.

In the registration step P1, the first user end 1*a* (requesting end) sends a registration request to the server end 2 (receiving end). Upon the receipt of the registration request, the server end 2 sends a first identification code ($SID_A$), a request key ($K_A$), a preliminary registration code (Ts$_a$), a set of pseudo identification codes (PID) and a set of emergency keys ($K_{em}$) to the first user end 1*a*. The set of pseudo identification codes (PID) includes a plurality of pseudo identification codes (pid$_j$), and the set of emergency keys ($K_{em}$) includes a plurality of emergency keys ($K_{em}$). In this regard, one of the plurality of emergency keys ($K_{em}$) corresponds to one of the plurality of pseudo identification codes (pid$_j$) of the set of pseudo identification codes (PID). Finally, the server end 2 sends a second identification code ($SID_B$) and an inquiry key ($K_B$) to the second user end 1*b* (inquiring end). Similarly, the server end 2 also sends a second identification code ($SID_B$) and an inquiry key ($K_B$) to the second user end 1*b*.

Figure 6:
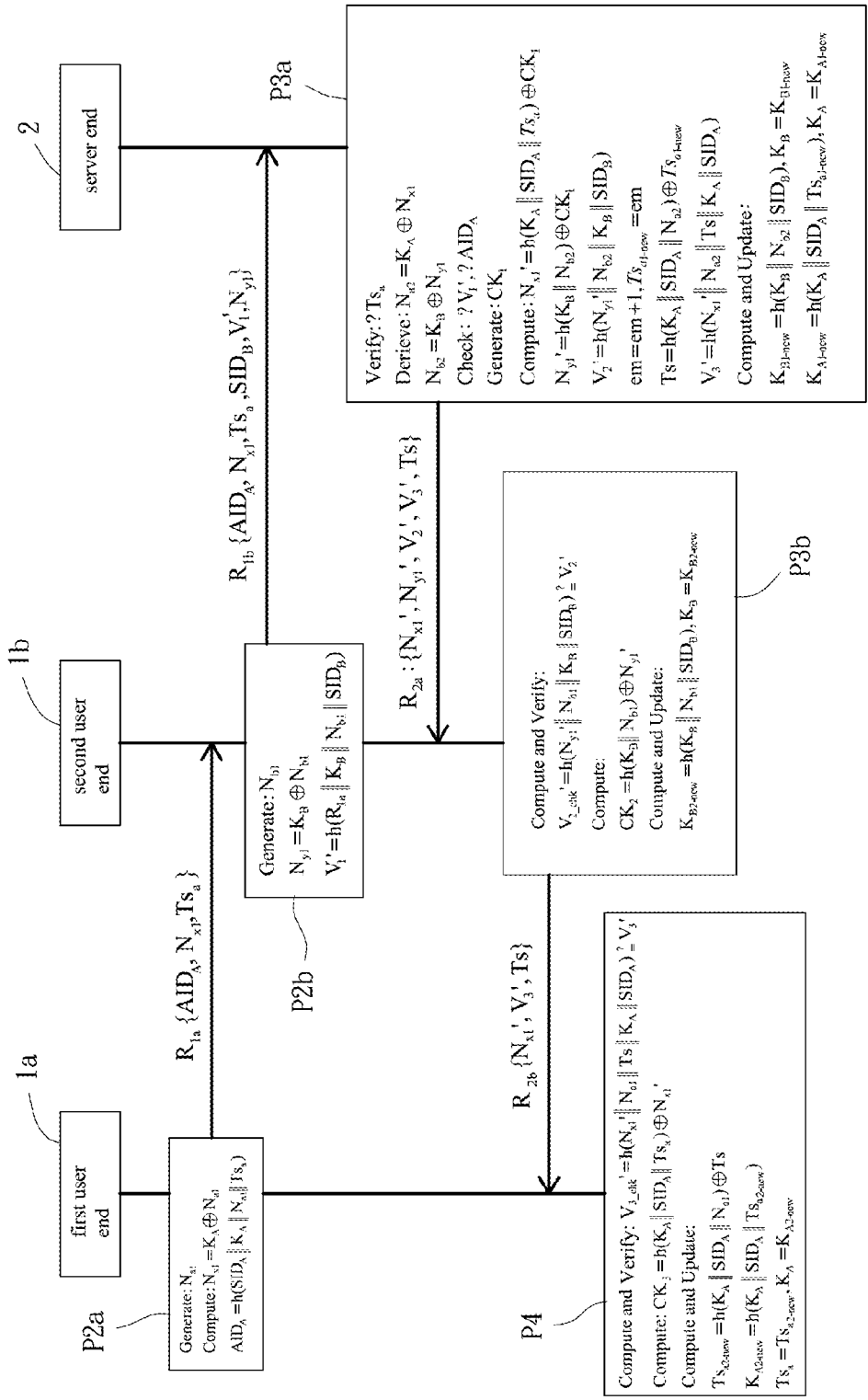
FIG. 6 shows an algorithm diagram of the authentication method in FIG. 5.

In the first inquiry step P2*a*, with reference made to FIG. 6, the first user end 1*a* performs the following steps as shown below:

Generate: $N_{a1}$
Compute: $N_{x1} = K_A \oplus N_{a1}$.
$AID_A = h(SID_A \| K_A \| Ts_a)$ First, the first user end 1*a* generates a first arbitrary code ($N_{a1}$) having a first predetermined value, and performs an XOR operation between the first arbitrary code ($N_{a1}$) and the request key ($K_A$) to generate a first calculated code ($N_{X1}$). Then, the first identification code ($SID_A$), the request key ($K_A$), the first arbitrary code ($N_{a1}$) and the preliminary registration code (Ts$_a$) are cascaded as a combined data, and the first user end 1*a* sets the value of the hash function of the combined data as an verification code ($AID_A$). Next, the first user end 1*a* combines the verification code ($AID_A$), the first calculated code ($N_{X1}$) and the preliminary registration code (Ts$_a$) as a first request code ($R_{1a}$), and sends the first request code ($R_{1a}$) to the second user end 1*b*.

In the second inquiry step P2*b*, with reference made to FIG. 6, upon the receipt of the first request code ($R_{1a}$), the second user end 1*b* performs the following steps as shown below:

Generate: $N_{b1}$
$N_{y1} = K_B \oplus N_{b1}$
$V_1' = h(R_{1a} \| K_B \| N_{b1} \| SID_B)$ First, the second user end 1*b* generates a second arbitrary code ($N_{b1}$) having a second predetermined value. Then, the second user end 1*b* performs an XOR operation between the second arbitrary code ($N_{b1}$) and the inquiry key ($K_B$) to generate a second calculated code ($N_{y1}$). At this point, the first request code ($R_{1a}$), the inquiry key ($K_B$), the second arbitrary code ($N_{b1}$) and the second identification code ($SID_B$) are cascaded as a combined data, and the second user end 1*b* sets the value of the hash function of the combined data as a first tested code ($V_1'$). Then, the second user end 1*b* combines the first request code ($R_{1a}$), the second identification code ($SID_B$), the first tested code ($V_1'$) and the second calculated code ($N_{y1}$) as a second request code ($R_{1b}$). Finally, the second user end 1*b* transmits the second request code ($R_{1b}$) to the server end 2.

In the first answering step P3*a*, with reference made to FIG. 6, upon the receipt of the second request code ($R_{1b}$), the server end 2 performs the following steps as shown below:

Verify: ?Ts$_a$
Derive $N_{a2} = K_A \oplus N_{x1}$
$N_{b2} = K_B \oplus N_{y1}$
Check: ?$V_1'$,? $AID_A$
Generate: $CK_1$
Compute: $N_{X1}' = h(K_A \| SID_A \| Ts_a) \oplus CK_1$
$N_{y1}' = h(K_B \| N_{b2}) \oplus CK_1$
$V_2' = h(N_{y1} \| N_{b2} \| K_B \| SID_B)$
em=em+1, Ts$_{a1\text{-}new}$=em
Ts=h($K_A \| SID_A \| N_{a2}$)⊕Ts$_{a1\text{-}new}$
$V_3' = h(N_{x1}' \| N_{a2} \| Ts \| K_A \| SID_A)$
Compute and Update:
$K_{B1\text{-}new} = h(K_B \| N_{b2} \| SID_B)$, $K_B = K_{B1\text{-}new}$
$K_{A1\text{-}new} = h(K_A \| SID_A \| TS_{a1\text{-}new})$, $K_A = K_{A1\text{-}new}$.

First, the server end 2 verifies whether the preliminary registration code (Ts$_a$) is correct or not. If not, the first user end 1*a* and the server end 2 may be no longer in synchronization. In this regard, the server end 2 will ask the first user end 1*a* to try another pseudo identification code (pid$_j$) and another emergency key ($K_{em}$), and then terminates the connection. If the preliminary registration code (Ts$_a$) is correct, the server end 2 performs an XOR operation between the request key ($K_A$) and the first calculated code ($N_{X1}$) to generate a third arbitrary code ($N_{a2}$) that is supposed to have the first predetermined value of the first arbitrary code ($N_{a1}$), and performs an XOR operation between the inquiry key ($K_B$) and the second calculated code ($N_{y1}$) to generate a fourth arbitrary code ($N_{b2}$) that is supposed to have the second predetermined value of the second arbitrary code ($N_{b1}$). Then, the first request code ($R_{1a}$), the inquiry key ($K_B$), the fourth arbitrary code ($N_{b2}$) and the second identification code ($SID_B$) are cascaded as a combined data, and the server end 2 verifies the first tested code ($V_1'$) with the determined value of the hash function of the combined data. Similarly, the first identification code ($SID_A$), the request key ($K_A$), the third arbitrary code ($N_{a2}$) and the preliminary registration code (Ts$_a$) are cascaded as a combined data, and the server end 2 verifies the verification code ($AID_A$) with the determined value of the hash function of the combined data. In this regard, if any one of the first tested code ($V_1'$) and the verification code ($AID_A$) is verified to be incorrect, the server end 2 terminates the connection. If they are correct, the server end 2 generates a first authentication key ($CK_1$). Then, the request key ($K_A$), the first identification code ($SID_A$) and the preliminary registration code ($Ts_a$) are cascaded as a combined data, and the server end 2 performs an XOR operation between the first authentication key ($CK_1$) and the value of the hash function of the combined data to generate a first calculated verification code ($N_{X1}'$). Next, the inquiry key ($K_B$) and the fourth arbitrary code ($N_{b2}$) are cascaded as a combined data, and the server end 2 performs an XOR operation between the first authentication key ($CK_1$) and the value of the hash function of the combined data to generate a second calculated verification code ($N_{y1}'$). Next, the second calculated verification code ($N_{y1}'$), the fourth arbitrary code ($N_{b2}$), the inquiry key ($K_B$) and the second identification code ($SID_B$) are cascaded as a combined data, and the server end 2 sets the value of the hash function of the combined data as a second tested code ($V_2'$). Next, the server end 2 increases the value of a variable (m) by an increment. The increment may be 1, but is not limited thereto. Then, the request key ($K_A$), the first identification code ($SID_A$) and the third arbitrary code ($N_{a2}$) are cascaded as a combined data, and the server end 2 performs an XOR operation between the first new registration code ($Ts_{a1-new}$) and the value of the hash function of the combined data to generate a final registration code (Ts). Then, the first calculated verification code ($N_{x1}'$), the third arbitrary code ($N_{a2}$), the final registration code (Ts), the request key ($K_A$) and the first identification code ($SID_A$) are cascaded as a combined data, and the server end 2 sets the value of the hash function of the combined data as a third tested code ($V_3'$). At this point, the inquiry key ($K_B$), the fourth arbitrary code ($N_{b2}$) and the second identification code ($SID_B$) are cascaded as a combined data, and the server end 2 sets the value of the hash function of the combined data as a first new inquiry key ($K_{B1-new}$). Then, the server end 2 updates the inquiry key ($K_B$) with the first new inquiry key ($K_{B1-new}$). Similarly, the request key ($K_A$), the first identification code ($SID_A$) and the first new registration code ($Ts_{a1-new}$) are cascaded as a combined data, and the server end 2 sets the value of the hash function of the combined data as a first new request key ($K_{A1-new}$). Then, the server end 2 updates the request key ($K_A$) with the first new request key ($K_{A1-new}$). Finally, the server end 2 combines the first calculated verification code ($N_{X1}'$), the second calculated verification code ($N_{y1}'$), the second tested code ($V_2'$), the third tested code ($V_3'$) and the final registration code (Ts) as a first response code ($R_{2a}$), and sends the first response code ($R_{2a}$) to the second user end 1b.

In the second answering step P3b, with reference made to FIG. 6 also, upon the receipt of the first response code ($R_{2a}$), the second user end 1b performs the following steps as shown below:

Compute and Verify:
$V_{2\_chk} = h(N_{y1}'\|N_{b1}\|K_B\|SID_B) \stackrel{?}{=} V_2'$
Compute:
$CK_2 = h(K_B\|N_{b1}) \oplus N_{y1}'$
Compute and Update:
$K_{B2-new} = h(K_B\|N_{b1}\|SID_B)$, $K_B = K_{B2-new}$ First, the second user end 1b verifies whether the second tested code ($V_2'$) is correct or not. Specifically, the second calculated verification code ($N_{y1}'$), the second arbitrary code ($N_{b1}$), the inquiry key ($K_B$) and the second identification code ($SID_B$) are cascaded as a combined data, and the second user end 1b determines a value ($V_{2\_chk}'$) of the hash function of the combined data is consistent with the second tested code ($V_2'$). If not, the second tested code ($V_2'$) is verified to be incorrect, and the second user end 1b terminates the connection. If the value ($V_{2\_chk}'$) is consistent with the second tested code ($V_2'$), the second tested code ($V_2'$) is verified to be correct. In this regard, the inquiry key ($K_B$) and the second arbitrary code ($N_{b1}$) are cascaded as a combined data, and the second user end 1b performs an XOR operation between the second calculated verification code ($N_{y1}'$) and the value of the hash function of the combined data to generate a second authentication key ($CK_2$). Then, the inquiry key ($K_B$), the second arbitrary code ($N_{b1}$) and the second identification code ($SID_B$) are cascaded as a combined data, and the second user end 1b sets the value of the hash function of the combined data as a second new inquiry key ($K_{B2-new}$). Finally, the second user end 1b updates the inquiry key ($K_B$) with the second new inquiry key ($K_{B2-new}$), combines the first calculated verification code ($N_1'$), the third tested code ($V_3'$) and the final registration code (Ts) as a second response code ($R_{2b}$), and sends the second response code ($R_{2b}$) to the first user end 1a.

In the verification step P4, with reference made to FIG. 6 also, upon the receipt of the second response code ($R_{2b}$), the first user end 1a performs the following steps as shown below:

Compute and Verify: $V_{3\_chk}' = h(N_{x1}'\|N_{a1}\|Ts\|K_A\|SID_A) \stackrel{?}{=} V_3'$
Compute: $CK_3 = h(K_A\|SID_A\|Ts_a) \oplus N_{x1}'$
Compute and Update
$Ts_{a2-new} = h(K_A\|SID_A\|N_{a1}) \oplus Ts$
$K_{A2-new} = h(K_A\|SID_A\|Ts_{a2-new})$
$Ts_a = TS_{a2-new}$, $K_A = K_{A2-new}$ First, the first user end 1a verifies whether the third tested code ($V_3'$) is correct first. Specifically, the first calculated verification code ($N_{X1}'$), the first arbitrary code ($N_{a1}$), the final registration code (Ts), the request key ($K_A$) and the first identification code ($SID_A$) are cascaded as a combined data, and the first user end 1a determines whether the value ($V_{3\_chk}'$) of the hash function of the combined data is consistent with the third tested code ($V_3'$). If not, the third tested code ($V_3'$) is verified to be incorrect, and the first user end 1a terminates the connection. If the determination is consistent, the request key ($K_A$), the first identification code ($SID_A$) and the preliminary registration code ($Ts_a$) are cascaded as a combined data, and the first user end 1a performs an XOR operation between the first calculated verification code ($N_{X1}'$) and the value of the hash function of the combined data to generate a third authentication key ($CK_3$). Then, the request key ($K_A$), the first identification code ($SID_A$) and the first arbitrary code ($N_{a1}$) are cascaded as a combined data, and the first user end 1a performs an XOR operation between the final registration code (Ts) and the value of the hash function of the combined data to generate a second new registration code ($Ts_{a1-new}$). Next, the request key ($K_A$), the first identification code ($SID_A$) and the second new registration code ($Ts_{a1-new}$) are cascaded as a combined data, and the first user end 1a sets the value of the hash function of the combined data as a second new request key ($K_{A2-new}$). Finally, the first user end 1a updates the preliminary registration code ($Ts_a$) with the second new registration code ($Ts_{a1-new}$), and updates the request key ($K_A$) with the second new request key ($K_{A2-new}$).

Figure 7:
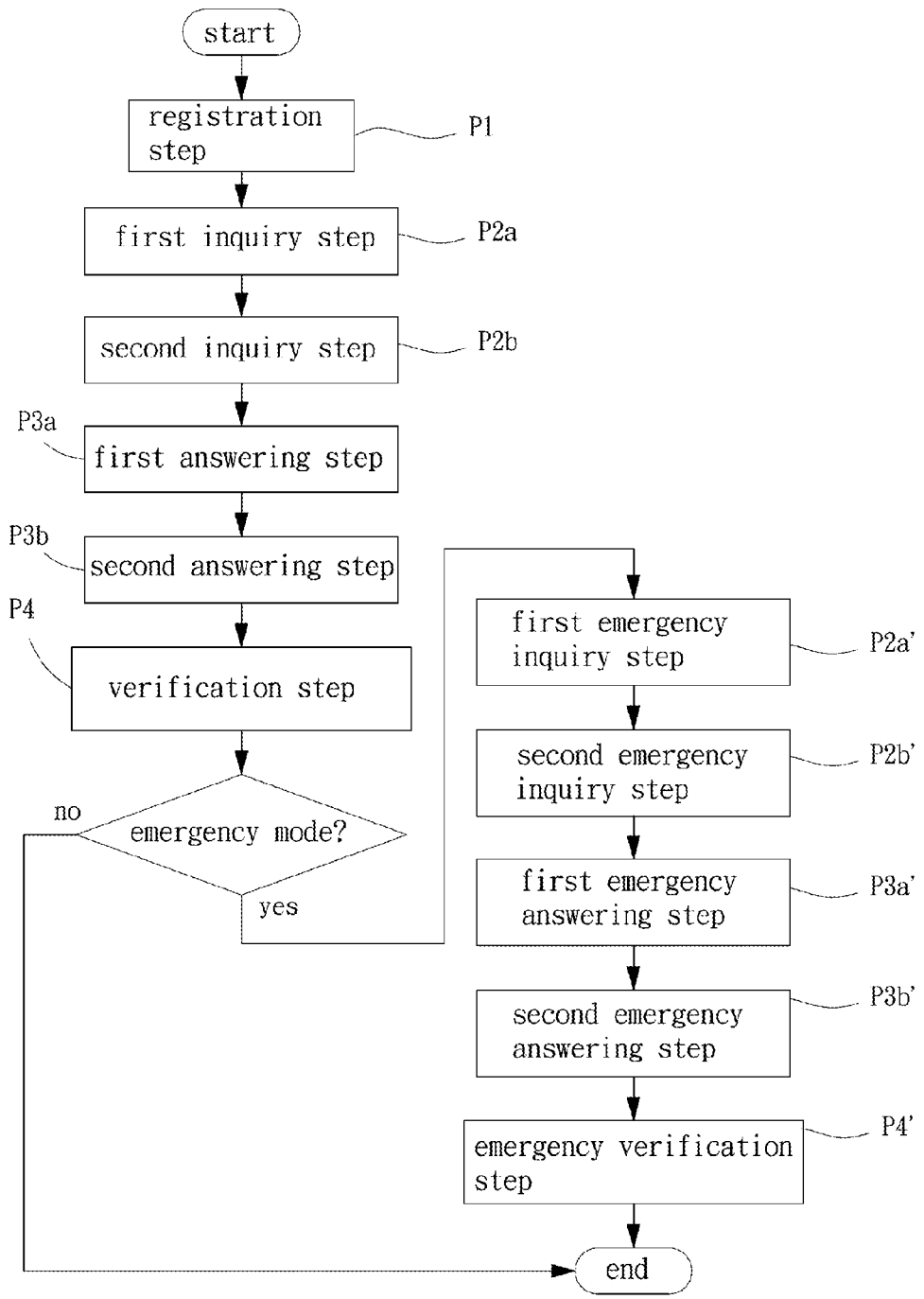
FIG. 7 shows a flowchart of the authentication method for the communication network according to the second embodiment of the invention, with the authentication method includes an emergency authentication mode.

In the second embodiment above, if the second response code ($R_{2b}$) generated in the second answering step P3b is not received by the first user end 1a within a predetermined period of time, or if the second response code ($R_{2b}$) is received by the first user end 1a but the third tested code ($V_3'$) is verified to be incorrect in the verification step P4, an emergency authentication mode is executed. The emergency authentication mode includes a first emergency inquiry step P2a', a second emergency inquiry step P2b', a first emergency answering step P3a', a second emergency answering step P3b' and an emergency verification step P4', as shown in FIG. 7.

Figure 8:
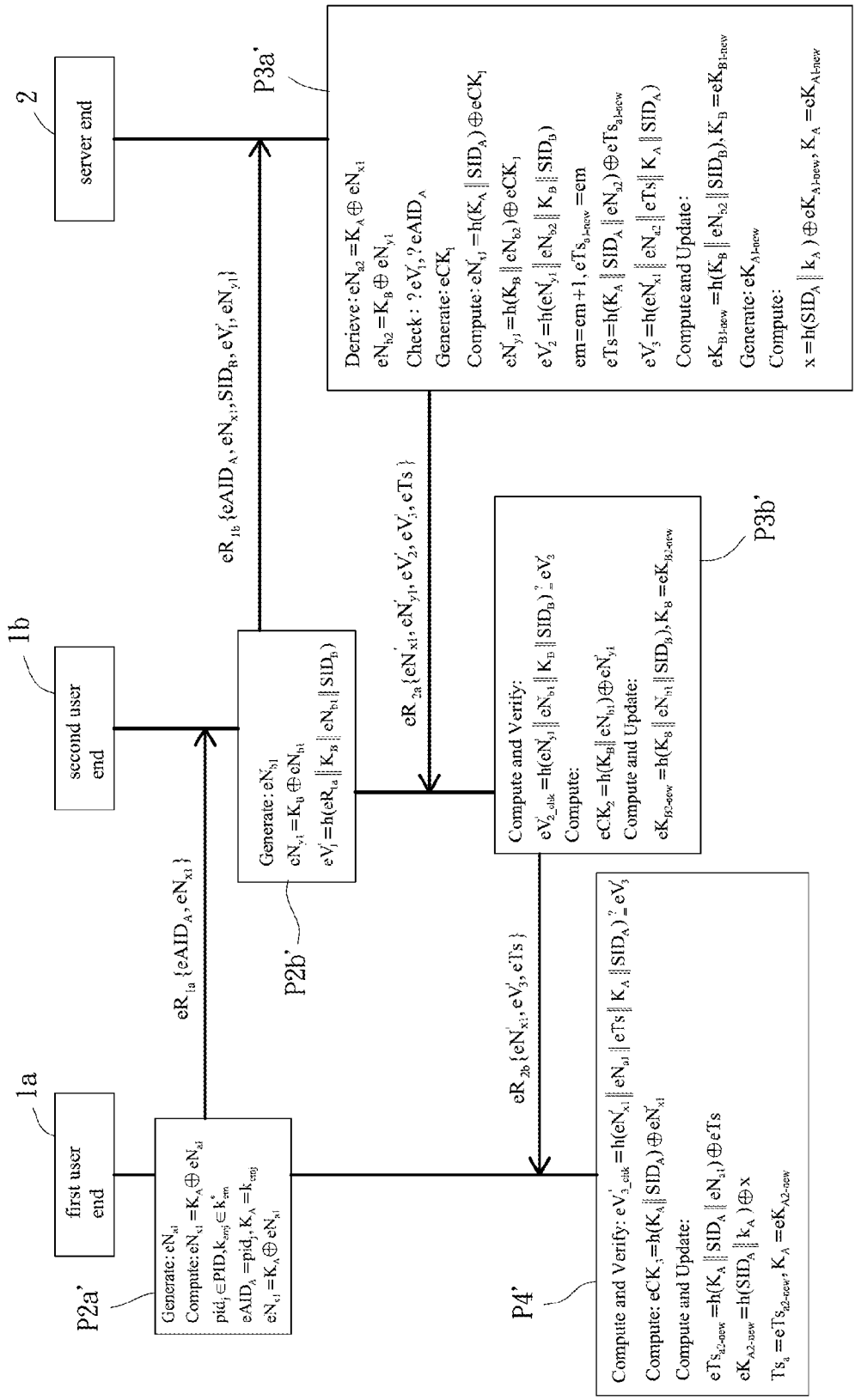
FIG. 8 shows an algorithm diagram of the authentication method in FIG. 7.

In the first emergency inquiry step P2a', with reference made to FIG. 8, the first user end 1a performs the following steps as shown below:

Generate: $eN_{a1}$
Compute:
$pid_j \in PID$, $k_{emj} \oplus k^*_{em}$.
$eAID_A = pid_j$, $K_A = k_{emj}$
$eN_{x1} = K_A \oplus eN_{a1}$ First, the first user end 1a generates a first arbitrary emergency code ($eN_{a1}$) having a first preset value, and sets another one of the plurality of pseudo identification codes ($pid_j$) of the set of pseudo identification codes (PID), which has never been used before, as an one-time alias identity ($eAID_A$). The other one of the plurality of pseudo identification codes ($pid_j$) that has never been used before is defined as an unused pseudo identification code ($pid_j$) hereinafter. The first user end 1a also sets another one of the plurality of emergency keys ($K_{emj}$) of the set of emergency keys ($K_{em}$), which has never been used before, as the request key ($K_A$). Similarly, the other one of the plurality of emergency keys ($K_{emj}$) that has never been used before is defined as an unused emergency key ($K_{emj}$) hereinafter. Then, the first user end 1a performs an XOR operation between the request key ($K_A$) and the first arbitrary emergency code ($eN_{a1}$) to generate a first calculated emergency code ($eN_{x1}$). Next, the first user end 1a combines the one-time alias identity ($eAID_A$) and the first calculated emergency code ($eN_{x1}$) as a first emergency request code ($eR_{1a}$), and sends the first emergency request code ($eR_{1a}$) to the second user end 1b.

In the second emergency inquiry step P2b', with reference made to FIG. 8 also, upon the receipt of the emergency request code ($eR_{1a}$), the second user end 1b performs the following steps as shown below:

Generate: $eN_{b1}$
$eN_{y1} = K_B \oplus eN_{b1}$.
$eV_1' = h(eR_{1a} \| K_B \| eN_{b1} \| SID_B)$ First, the second user end 1b generates a second arbitrary emergency code ($eN_{b1}$) having a second preset value, and performs an XOR operation between the second arbitrary emergency code ($eN_{b1}$) and the inquiry key ($K_B$) to generate a second calculated emergency code ($eN_{y1}$). Then, the first emergency request code ($eR_{1a}$), the inquiry key ($K_B$), the second arbitrary emergency code ($eN_{b1}$) and the second identification code ($SID_B$) are cascaded as a combined data, and the second user end 1b sets the value of the hash function of the combined data as a first emergency tested code ($eV_1'$). Next, the second user end 1b combines the first emergency request code ($eR_{1a}$), the second identification code ($SID_B$), the first emergency tested code ($eV_1'$) and the second calculated emergency code ($eN_{y1}$) as a second emergency request code ($eR_{1b}$), and sends the second emergency request code ($eR_{1b}$) to the server end 2.

In the first emergency answering step P3a', with reference made to FIG. 8 also, upon the receipt of the second emergency request code ($eR_{1b}$), the server end 2 performs the following steps as shown below:

Derive $eN_{a2} = K_A \oplus eN_{x1}$
$eN_{b2} = K_B \oplus eN_{y1}$
Check: $?eV_1'$, $?eAID_A$
Generate: $eCK_1$
Compute: $eN_{x1}' = h(K_A \| SID_A) \oplus eCK_1$
$eN_{y1}' = h(K_B \| eN_{b2}) \oplus eCK_1$
$eV_2' = h(eN_{y1}' \| eN_{b2} \| K_B \| SID_B)$
$em = em+1$, $eTs_{a1-new} = em$ $eTs = h(K_A \| SID_A \| eN_{a2}) \oplus eTs_{a1-new}$
$eV_3' = h(eN_{x1}' \| eN_{a2} \| eTs \| K_A \| SID_A)$
Compute and Update:
$eK_{B1-new} = h(K_B \| eN_{b2} \| SID_B)$, $K_B = eK_{B1-new}$
$eK_{A1-new} = h(K_A \| SID_A \| eTs_{a1-new})$, $K_A = eK_{A1-new}$
Generate: $eK_{A1-new}$
Compute:
$x = h(SID_A \| k_{emj}) \oplus eK_{A1-new}$, $K_A = eK_{A1-new}$ First, the server end 2 performs an XOR operation between the request key ($K_A$) and the first calculated emergency code ($eN_{x1}$) to generate a third arbitrary emergency code ($eN_{a2}$) having the first preset value of the first arbitrary emergency code ($eN_{a1}$), and performs an XOR operation between the inquiry key ($K_B$) and the second calculated emergency code ($eN_{y1}$) to generate a fourth arbitrary emergency code ($eN_{b2}$) having the second present value of the second arbitrary emergency code ($eN_{b1}$). In this regard, the first emergency request code ($eR_{1a}$), the inquiry key ($K_B$), the fourth arbitrary emergency code ($eN_{b2}$) and the second identification code ($SID_B$) are cascaded as a combined data, and the server end 2 verifies whether the first emergency tested code ($eV_1'$) is correct using the value of the hash function of the combined data. In addition, the server end 2 verifies whether the unused pseudo identification code ($pid_j$) is contained in the one-time alias identity ($eAID_A$). If the unused pseudo identification code ($pid_j$) is not contained in the one-time alias identity ($eAID_A$) or if the first emergency tested code ($eV_1'$) is incorrect, the server end 2 will ask the first user end 1a to try another unused pseudo identification code ($pid_j$) and another unused emergency key ($K_{em}$), and then terminates the connection. If the unused pseudo identification code ($pid_j$) is contained in the one-time alias identify ($eAID_A$) and the first emergency tested code ($eV_1'$) is correct, the server end 2 generates a first secret authentication key ($eCK_1$), which will be used in next transaction between the user and server. At this point, the request key ($K_A$) and the first identification code ($SID_A$) are cascaded as a combined data, and the server end 2 performs an XOR operation between the first secret authentication key ($eCK_1$) and the value of the hash function of the combined data to generate a first calculated emergency verification code ($eN_{x1}'$). Then, the inquiry key ($K_B$) and the fourth arbitrary emergency code ($eN_{b2}$) are cascaded as a combined data, and the server end 2 performs an XOR operation between the first secret authentication key ($eCK_1$) and the value of the hash function of the combined data to generate a second calculated emergency verification code ($eN_{y1}'$). Then, the second calculated emergency verification code ($eN_{y1}'$), the fourth arbitrary emergency code ($eN_{b2}$), the inquiry key ($K_B$) and the second identification code ($SID_B$) are cascaded as a combined data, and the server end 2 sets the value of the hash function of the combined data as a second emergency tested code ($eV_2'$). Next, the value of the variable (em) is increased by the increment, and the value of the variable (em) is set as a first new emergency registration code ($eTs_{a1-new}$). Next, the request key ($K_A$), the first identification code ($SID_A$) and the third arbitrary emergency code ($eN_{a2}$) are cascaded as a combined data, and the server end 2 performs an XOR operation between the first new emergency registration code ($eTs_{a1-new}$) and the value of the hash function of the combined data to generate a final emergency registration code ($eTs$). Then, the first calculated emergency verification code ($eN_{x1}'$), the third arbitrary emergency code ($eN_{a2}$), the final emergency registration code ($eTs$), the request key ($K_A$) and the first identification code ($SID_A$) are cascaded as a combined data, and the server end 2 sets the value of the hash function of the combined data as a third emergency tested code (eV$_3$'). Then, the inquiry key (K$_B$), the fourth arbitrary emergency code (eN$_{b2}$) and the second identification code (SID$_B$) are cascaded as a combined data, and the server end 2 sets the value of the hash function of the combined data as a first new emergency inquiry key (eK$_{B1\text{-}new}$). Next, the server end 2 generates a first new emergency request key (eK$_{A1\text{-}new}$). In this regard, the identification code (SID$_A$) and the request key (K$_A$) are cascaded as a combined data, and the server end 2 performs an XOR operation between the first new emergency request key (eK$_{A1\text{-}new}$) and the value of the hash function of the combined data to generate an emergency registration code (x). Then, the server end 2 updates the request key (K$_A$) with the first new emergency request key (eK$_{A1\text{-}new}$). Finally, the server end 2 combines the first calculated emergency verification code (eN$_{x1}$'), the second calculated emergency verification code (eN$_{y1}$'), the second emergency tested code (eV$_2$'), the third emergency tested code (eV$_3$'), the final emergency registration code (eTs) and the emergency registration code (x) as a first emergency response code (eR$_{2a}$), and sends the first emergency response code (eR$_{2a}$) to the second user end 1b.

In the second emergency answering step P3b', with reference made to FIG. 8 also, upon the receipt of the first response code (eR$_{2a}$), the second user end 1b performs the following steps as shown below:

Compute and Verify:
eV$_{2\_chk}$'=h(eN$_{y1}$'∥eN$_{b1}$∥K$_B$∥SID$_B$)≟eV$_2$'
Compute:
eCK$_2$=h(K$_B$∥eN$_{b1}$)⊕eN$_{y1}$'.
Compute and Update:
eK$_{B2\text{-}new}$=h(K$_B$∥eN$_{b1}$∥SID$_B$), K$_B$=eK$_{B2\text{-}new}$ First, the second user end 1b verifies whether the second emergency tested code (eV$_2$') is correct first. Specifically, the second calculated emergency verification code (eN$_{y1}$'), the second arbitrary emergency code (eN$_{b1}$), the inquiry key (K$_B$) and the second identification code (SID$_B$) are cascaded as a combined data, and the second user end 1b verifies whether the second emergency tested code (eV$_2$') is correct using the value (eV$_{2\_chk}$') of the hash function of the combined data. If the second emergency tested code (eV$_2$') is incorrect, the second user end 1b terminates the connection. If the second emergency tested code (eV$_2$') is correct, the inquiry key (K$_B$) and the second arbitrary emergency code (eN$_{b1}$) are cascaded as a combined data, and the second user end 1b performs an XOR operation between the second calculated emergency verification code (eN$_{y1}$') and the value of the hash function of the combined data to generate a second secret authentication key (eCK$_2$). Then, the inquiry key (K$_B$), the second arbitrary emergency code (eN$_{b1}$) and the second identification code (SID$_B$) are cascaded as a combined data, and the second user end 1b sets the value of the hash function of the combined data as a second new emergency inquiry key (eK$_{B2\text{-}new}$). Next, second user end 1b updates the inquiry key (K$_B$) with the second new emergency inquiry key (eK$_{B2\text{-}new}$), and combines the first calculated emergency verification code (eN$_{x1}$'), the third emergency tested code (eV$_3$') and the final emergency registration code (eTs) as a second emergency response code (eR$_{2b}$). Finally, the second user end 1b sends the second emergency response code (eR$_{2b}$) to the first user end 1a.

In the emergency verification step P4', with reference made to FIG. 8 also, upon the receipt of the second emergency request code (eR$_{2b}$), the first user end 1a performs the following steps as shown below:

Compute and Verify: eV$_{3\_chk}$'=h(eN$_{x1}$'∥eN$_{a1}$∥eTs∥K$_A$∥SID$_A$)≟eV$_3$'

Compute: eCK$_3$=h(K$_A$∥SID$_A$)⊕eN$_{x1}$'
Compute and Update:
eTs$_{a2\text{-}new}$=h(K$_A$∥SID$_A$∥eN$_{a1}$)⊕eTs.
eK$_{A2\text{-}new}$=h(K$_A$∥SID$_A$∥eTs$_{a2\text{-}new}$)
Ts$_a$=eTs$_{a2\text{-}new}$, K$_A$=eK$_{A2\text{-}new}$
eK$_{A2\text{-}new}$=h(SID$_A$∥k$_{emj}$)⊕x, K$_A$=eK$_{A2\text{-}new}$ First, the first user end 1a verifies whether the third emergency tested code (eV$_3$') is correct first. Specifically, the first calculated emergency verification code (eN$_{x1}$'), the first arbitrary emergency code (eN$_{a1}$), the final emergency registration code (eTs), the request key (K$_A$) and the identification code (SID$_A$) are cascaded as a combined data, and the first user end 1a verifies the third emergency tested code (eV$_3$') using the value (eV$_{3\_chk}$') of the hash function of the combined data. If the third emergency tested code (eV$_3$') is incorrect, the first user end 1a terminates the connection. If the third emergency tested code (eV$_3$') is correct, the request key (K$_A$) and the identification code (SID$_A$) are cascaded as a combined data, and the first user end 1a performs an XOR operation between the first calculated emergency verification code (eN$_{x1}$') and the value of the hash function of the combined data to generate a third secret authentication key (eCK$_3$). Then, the request key (K$_A$), the identification code (SID$_A$) and the first arbitrary emergency code (eN$_{a1}$) are cascaded as a combined data, and the first user end 1a performs an XOR operation between the final emergency registration code (eTs) and the value of the hash function of the combined data to generate a second new emergency registration code (eTs$_{a2\text{-}new}$). Finally, the identification code (SID$_A$) and the request key (K$_A$) are cascaded as a combined data, and the first user end 1a performs an XOR operation between the emergency registration code (x) and the value of the hash function of the combined data to generate a second new emergency request key (eK$_{A2\text{-}new}$). Finally, the first user end 1a updates the request key (K$_A$) with the second new emergency request key (eK$_{A2\text{-}new}$), and updates the preliminary registration code (Ts$_a$) with the second new emergency registration code (eTs$_{a2\text{-}new}$).

It also noted that in the second embodiment above, the second user end 1b may also act as a server (e.g. a cloud server).

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An authentication method for a low-computational-capacity device in a communication network, the method comprising:

a registration step (S1) including the operations of:

transmitting a registration request to a receiving end (C) by a requesting end (A); and transmitting an identification code (SID$_A$), a request key (K$_A$), a preliminary registration code (Ts$_a$), a set of pseudo identification codes (PID) and a set of emergency keys (K$_{em}$) to the requesting end (A) by the receiving end (C), wherein the set of pseudo identification codes (PID) comprises a plurality of pseudo identification codes (pid$_j$), wherein the set of emergency keys (K$_{em}$) comprises a plurality of emergency keys (K$_{em}$), and wherein one of the plurality of emergency keys (K$_{em}$) of the set of emergency keys (K$_{em}$) corresponds to one of the plurality of pseudo identification codes (pid$_j$) of the set of pseudo identification codes (PID);

an inquiry step (S2) performed by the requesting end (A), the inquiry step (S2) including the operations of:
generating a first arbitrary code ($N_{a1}$) having a predetermined value;
performing an XOR (exclusive or) operation between the first arbitrary code ($N_{a1}$) and the request key ($K_A$) to generate a calculated code ($N_X$);
setting a value of a hash function of a combined data of the identification code ($SID_A$), the request key ($K_A$), the first arbitrary code ($N_{a1}$) and the preliminary registration code ($Ts_a$) as a verification code ($AID_A$);
combining the verification code ($AID_A$), the calculated code ($N_X$) and the preliminary registration code ($Ts_a$) as a request code ($R_1$); and
transmitting the request code ($R_1$) to the receiving end (C);
an answering step (S3) performed by the receiving end (C) if the preliminary registration code ($Ts_a$) is verified to be correct by the receiving end (C), the answering step (S3) including the operations of:
performing an XOR operation between the request key ($K_A$) and the calculated code ($N_X$) to generate a second arbitrary code ($N_{a2}$) having the predetermined value;
verifying the verification code ($AID_A$) with a determined value of the hash function of a combined data of the identification code ($SID_A$), the request key ($K_A$), the second arbitrary code ($N_{a2}$) and the preliminary registration code ($Ts_a$);
generating a first authentication key ($CK_1$) after the verification code ($AID_A$) is verified to be correct;
performing an XOR operation between the first authentication key ($CK_1$) and a value of the hash function of a combined data of the request key ($K_A$), the identification code ($SID_A$) and the preliminary registration code ($Ts_a$) to generate a calculated verification code ($N_X'$);
increasing a value of a variable (m) by an increment;
setting the value of the variable (m) as a first new registration code ($TS_{a1-new}$);
performing an XOR operation between the first new registration code ($Ts_{a1-new}$) and a value of the hash function of a combined data of the request key ($K_A$), the identification code ($SID_A$) and the second arbitrary code ($N_{a2}$) to generate a final registration code (Ts);
setting a value of the hash function of a combined data of the calculated verification code ($N_X'$), the second arbitrary code ($N_{a2}$), the final registration code (Ts), the request key ($K_A$) and the identification code ($SID_A$) as a first confirmation code ($V_1$);
setting a value of the hash function of a combined data of the request key ($K_A$), the identification code ($SID_A$) and the first new registration code ($Ts_{a1-new}$) as a first new request key ($K_{A1-new}$);
updating the request key ($K_A$) with the first new request key ($K_{A1-new}$);
combining the calculated verification code ($N_X'$), the first confirmation code ($V_1$) and the final registration code (Ts) as a response code ($R_2$); and
transmitting the response code ($R_2$) to the requesting end (A); and
a verification step (S4) performed by the requesting end (A) if the first confirmation code ($V_1$) is verified to be correct using a determined value ($V_{1-chk}$) of the hash function of a combined data of the calculated verification code ($N_X'$), the first arbitrary code ($N_{a1}$), the final registration code (Ts), the request key ($K_A$) and the identification code ($SID_A$), the verification step (S4) including the operations of:
performing an XOR operation between the calculated verification code ($N_X'$) and a value of the hash function of a combined data of the request key ($K_A$), the identification code ($SID_A$) and the preliminary registration code ($Ts_a$) to generate a second authentication key ($CK_2$);
performing an XOR operation between the final registration code (Ts) and a value of the hash function of a combined data of the request key ($K_A$), the identification code ($SID_A$) and the first arbitrary code ($N_{a1}$) to generate a second new registration code ($TS_{a2-new}$);
setting the value of the hash function of a combined data of the request key ($K_A$), the identification code ($SID_A$) and the second new registration code ($Ts_{a2-new}$) as a second new request key ($K_{A2-new}$);
updating the preliminary registration code ($Ts_a$) with the second new registration code ($TS_{a1-new}$); and
updating the request key ($K_A$) with the second new request key ($K_{A2-new}$);
executing an emergency authentication mode if the response code ($R_2$) is not received by the requesting end (A) within a predetermined period of time or if the first confirmation code ($V_1$) is verified to be incorrect by the requesting end (A), the emergency authentication mode including:
an emergency inquiry step (S2') performed by the requesting end (A), the emergency inquiry step (S2') including the operations of:
generating a first arbitrary emergency code ($eN_{a1}$) having a preset value;
setting another one of the plurality of pseudo identification codes ($pid_j$) of the set of pseudo identification codes (PID) as an one-time alias identity ($eAID_A$);
setting another one of the plurality of emergency keys ($K_{emj}$) of the set of emergency keys ($K_{em}$) as the request key ($K_A$);
performing an XOR operation between the request key ($K_A$) and the first arbitrary emergency code ($eN_{a1}$) to generate a calculated emergency code ($eN_X$);
combining the one-time alias identity ($eAID_A$) and the calculated emergency code ($eN_X$) as an emergency request code ($eR_1$); and
transmitting the emergency request code ($eR_1$) to the receiving end (C);
an emergency answering step (S3') performed by the receiving end (C) if the one-time alias identity ($eAID_A$) is verified to contain the other one of the plurality of pseudo identification codes ($pid_j$) and if the other one of the plurality of emergency keys ($K_{emj}$) is verified to be in correspondence to the other one of the plurality of pseudo identification codes ($pid_j$), the emergency answering step (S3') including the operations of:
setting the other one of the plurality of emergency keys ($K_{emj}$) as the request key ($K_A$);
performing an XOR operation between the request key ($K_A$) and the calculated emergency code ($eN_X$) to generate a second arbitrary emergency code ($eN_{a2}$) having the preset value;
generating a first secret authentication key ($eCK_1$);

performing an XOR operation between the first secret authentication key ($eCK_1$) and a value of the hash function of a combined data of the request key ($K_A$) and the identification code ($SID_A$) to generate a calculated emergency verification code ($eN_X'$);

increasing the value of the variable (em) by the increment;

setting the value of the variable (em) as a first new emergency registration code ($eTs_{a1-new}$);

performing an XOR operation between the first new emergency registration code ($eTs_{a1-new}$) and a value of the hash function of a combined data of the request key ($K_A$), the identification code ($SID_A$) and the secondary arbitrary emergency code ($eN_{a2}$) to generate a final emergency registration code (eTs);

setting a value of the hash function of a combined data of the calculated emergency verification code ($eN_X'$), the secondary arbitrary emergency code ($eN_{a2}$), the final emergency registration code (eTs), the request key ($K_A$) and the identification code ($SID_A$) as a first emergency confirmation code ($eV_1$);

generating a first new emergency request key ($eK_{A1-new}$);

performing an XOR operation between the first new emergency request key ($eK_{A1-new}$) and a value of the hash function of a combined data of the identification code ($SID_A$) and the other one of the plurality of emergency keys ($K_{emj}$) to generate an emergency registration code (x);

updating the request key ($K_A$) with the first new emergency request key ($eK_{A1-new}$);

combining the calculated emergency verification code ($eN_X'$), the first emergency confirmation code ($eV_1$), the final emergency registration code (eTs) and the emergency registration code (x) as an emergency response code ($eR_2$); and transmitting the emergency response code ($eR_2$) to the requesting end (A); and an emergency verification step (S4') performed by the requesting end (A) if the first emergency confirmation code ($eV_1$) is verified to be correct using a determined value ($eV_{1-chk}$) of the hash function of a combined data of the calculated emergency verification code ($eN_X'$), the first arbitrary emergency code ($eN_{a1}$), the final emergency registration code (eTs), the request key ($K_A$) and the identification code ($SID_A$), the emergency verification step (S4') including the operations of:

performing an XOR operation between the calculated emergency verification code ($eN_X'$) and a value of the hash function of a combined data of the request key ($K_A$), the identification code ($SID_A$) and the preliminary registration code ($Ts_a$) to generate a second secret authentication key ($eCK_2$);

performing an XOR operation between the final emergency registration code (eTs) and a value of the hash function of a combined data of the request key ($K_A$), the identification code ($SID_A$) and the first arbitrary emergency code ($eN_{a1}$) to generate a second new emergency registration code ($eTs_{a2-new}$);

performing an XOR operation between the emergency registration code (x) and a value of the hash function of a combined data of the identification code ($SID_A$) and the other one of the plurality of emergency keys ($K_{emj}$) to generate a second new emergency request key ($eK_{A2-new}$);

updating the request key ($K_A$) with the second new emergency request key ($eK_{A2-new}$); and updating the preliminary registration code ($Ts_a$) with the second new emergency registration code ($eTs_{a2-new}$).

2. The authentication method for the communication network as claimed in claim 1, wherein the identification code ($SID_A$) is a communication key, a signature, a certificate or a license.

3. The authentication method for the communication network as claimed in claim 1, wherein the preliminary registration code ($Ts_a$) is a series of numbers arranged in a descending or ascending order.

4. The authentication method for the communication network as claimed in claim 1, wherein the pseudo identification code ($pid_j$) is a random number of a timestamp.

5. An authentication method for a low-computational-capacity device in a communication network, the method comprising:

a registration step (P1) including the operations of:
transmitting a registration request to a receiving end (C) by a requesting end (A);
transmitting a first identification code ($SID_A$), a request key ($K_A$), a preliminary registration code ($Ts_a$), a set of pseudo identification codes (PID) and a set of emergency keys ($K_{em}$) to the requesting end (A) by the receiving end (C), wherein the set of pseudo identification codes (PID) comprises a plurality of pseudo identification codes ($pid_j$), wherein the set of emergency keys ($K_{em}$) comprises a plurality of emergency keys ($K_{em}$), and wherein one of the plurality of emergency keys ($K_{em}$) of the set of emergency keys ($K_{en}$) corresponds to one of the plurality of pseudo identification codes ($pid_j$) of the set of pseudo identification codes (PID); and
transmitting a second identification code ($SID_B$) and an inquiry key ($K_B$) to an inquiry end (B), as performed by the receiving end (C);

a first inquiry step (P2a) performed by the requesting end (A), the first inquiry step (P2a) including the operations of:
generating a first arbitrary code ($N_{a1}$) having a first predetermined value;
performing an XOR operation between the first arbitrary code ($N_{a1}$) and the request key ($K_A$) to generate a first calculated code ($N_{x1}$);
setting a value of a hash function of a combined data of the first identification code ($SID_A$), the request key ($K_A$), the first arbitrary code ($N_{a1}$) and the preliminary registration code ($Ts_a$) as a verification code ($AID_A$);
combining the verification code ($AID_A$), the first calculated code ($N_{X1}$) and the preliminary registration code ($Ts_a$) as a first request code ($R_{1a}$); and
transmitting the first request code ($R_{1a}$) to an inquiry end (B);

a second inquiry step (P2b) performed by the inquiry end (B), the second inquiry step (P2b) including the operations of:
generating a second arbitrary code ($N_{b1}$) having a second predetermined value;

performing an XOR operation between the second arbitrary code ($N_{b1}$) and the inquiry key ($K_B$) to generate a second calculated code ($N_{y1}$);

setting a value of a hash function of a combined data of the first request code ($R_{1a}$), the inquiry key ($K_B$), the second arbitrary code ($N_{b1}$) and the second identification code ($SID_B$) as a first tested code ($V_1'$);

combining the first request code ($R_{1a}$), the second identification code ($SID_B$), the first tested code ($V_1'$) and the second calculated code ($N_{y1}$) as a second request code ($R_{1b}$); and transmitting the second request code ($R_{1b}$) to the receiving end (C);

a first answering step (P3a) performed by the receiving end (C) if the preliminary registration code ($Ts_a$) is verified to be correct by the receiving end (C), the first answering step (P3a) including the operations of:

performing an XOR operation between the request key ($K_A$) and the first calculated code ($N_{X1}$) to generate a third arbitrary code ($N_{a2}$) having the first predetermined value of the first arbitrary code ($N_{a1}$);

performing an XOR operation between the inquiry key ($K_B$) and the second calculated code ($N_{y1}$) to generate a fourth arbitrary code ($N_{b2}$) having the second predetermined value of the second arbitrary code ($N_{b1}$);

verifying the first tested code ($V_1'$) with a determined value of the hash function of a combined data of the first request code ($R_{1a}$), the inquiry key ($K_B$), the fourth arbitrary code ($N_{b2}$) and the second identification code ($SID_B$);

verifying the verification code ($AID_A$) with a determined value of the hash function of a combined data of the first identification code ($SID_A$), the request key ($K_A$), the third arbitrary code ($N_{a2}$) and the preliminary registration code ($Ts_a$), wherein, if both the first tested code ($V_1'$) and the verification code ($AID_A$) are verified to be correct, the first answering step (P3a) further includes the operations of:

generating a first authentication key ($CK_1$);

performing an XOR operation between the first authentication key ($CK_1$) and a value of the hash function of a combined data of the request key ($K_A$), the first identification code ($SID_A$) and the preliminary registration code ($Ts_a$) to generate a first calculated verification code ($N_{X1}'$);

performing an XOR operation between the first authentication key ($CK_1$) and a value of the hash function of a combined data of the inquiry key ($K_B$) and the fourth arbitrary code ($N_{b2}$) to generate a second calculated verification code ($N_{y1}'$);

setting a value of the hash function of a combined data of the second calculated verification code ($N_{y1}'$), the fourth arbitrary code ($N_{b2}$), the inquiry key ($K_B$) and the second identification code ($SID_B$) as a second tested code ($V_2'$);

increasing a value of a variable (m) by an increment;

setting the value of the variable (m) as a first new registration code ($TS_{a1-new}$);

performing an XOR operation between the first new registration code ($Ts_{a1-new}$) and a value of the hash function of a combined data of the request key ($K_A$), the first identification code ($SID_A$) and the third arbitrary code ($N_{a2}$) to generate a final registration code (Ts);

setting a value of the hash function of a combined data of the first calculated verification code ($N_{X1}'$), the third arbitrary code ($N_{a2}$), the final registration code (Ts), the request key ($K_A$) and the first identification code ($SID_A$) as a third tested code ($V_3'$);

setting a value of the hash function of a combined data of the inquiry key ($K_B$), the fourth arbitrary code ($N_{b2}$) and the second identification code ($SID_B$) as a first new inquiry key ($K_{B1-new}$);

updating the inquiry key ($K_B$) with the first new inquiry key ($K_{B1-new}$);

setting a value of the hash function of a combined data of the request key ($K_A$), the first identification code ($SID_A$) and the first new registration code ($Ts_{a1-new}$) as a first new request key ($K_{A1-new}$);

updating the request key ($K_A$) with the first new request key ($K_{A1-new}$);

combining the first calculated verification code ($N_{X1}'$), the second calculated verification code ($N_{y1}'$), the second tested code ($V_2'$), the third tested code ($V_3'$) and the final registration code (Ts) as a first response code ($R_{2a}$); and transmitting the first response code ($R_{2a}$) to the inquiry end (B);

a second answering step (P3b) performed by the inquiry end (B) if the second tested code ($V_2'$) is verified to be correct using a determined value ($V_{2-chk}'$) of the hash function of a combined data of the second calculated verification code ($N_{y1}'$), the second arbitrary code ($N_{b1}$), the inquiry key ($K_B$) and the second identification code ($SID_B$) the second answering step (P3b) including the operations of:

performing an XOR operation between the second calculated verification code ($N_{y1}'$) and a value of the hash function of a combined data of the inquiry key ($K_B$) and the second arbitrary code ($N_{b1}$) to generate a second authentication key ($CK_2$);

setting a value of the hash function of a combined data of the inquiry key ($K_B$), the second arbitrary code ($N_{b1}$) and the second identification code ($SID_B$) as a second new inquiry key ($K_{B2-new}$);

updating the inquiry key ($K_B$) with the second new inquiry key ($K_{B2-new}$);

combining the first calculated verification code ($N_{X1}'$), the third tested code ($V_3'$) and the final registration code (Ts) as a second response code ($R_{2b}$); and transmitting the second response code ($R_{2b}$) to the requesting end (A); and a verification step (P4) performed by the requesting end (A) if the third tested code ($V_3'$) is verified to be correct using a determined value ($V_{3-chk}'$) of the hash function of a combined data of the first calculated verification code ($N_{X1}'$), the first arbitrary code ($N_{a1}$), the final registration code (Ts), the request key ($K_A$) and the first identification code ($SID_A$), the verification step (P4) including the operations of:

performing an XOR operation between the first calculated verification code ($N_{X1}'$) and a value of the hash function of a combined data of the request key ($K_A$), the first identification code ($SID_A$) and the preliminary registration code ($Ts_a$) to generate a third authentication key ($CK_3$);

performing an XOR operation between the final registration code (Ts) and a value of the hash function of a combined data of the request key ($K_A$), the first identification code ($SID_A$) and the first arbitrary code ($N_{a1}$) to generate a second new registration code ($Ts_{a2-new}$);

setting a value of the hash function of a combined data of the request key ($K_A$), the first identification code ($SID_A$) and the second new registration code ($Ts_{a2-new}$) as a second new request key ($K_{A2-new}$);

updating the preliminary registration code ($Ts_a$) with the second new registration code ($Ts_{a2-new}$); and updating the request key ($K_A$) with the second new request key ($K_{A2-new}$);

executing an emergency authentication mode if the second response code ($R_{2b}$) is not received by the requesting end (A) within a predetermined period of time or if the third tested code ($V_3'$) is verified to be incorrect, the emergency authentication mode including:

a first emergency inquiry step (P2$a'$) performed by the requesting end (A), the first emergency inquiry step (P2$a'$) including the operations of:

generating a first arbitrary emergency code ($eN_{a1}$) having a first preset value;

setting another one of the plurality of pseudo identification codes ($pid_j$) of the set of pseudo identification codes (PID) as an one-time alias identity ($eAID_A$);

setting another one of the plurality of emergency keys ($K_{emj}$) of the set of emergency keys ($K_{em}$) as the request key ($K_A$);

performing an XOR operation between the request key ($K_A$) and the first arbitrary emergency code ($eN_{a1}$) to generate a first calculated emergency code ($eN_{X1}$);

combining the one-time alias identity ($eAID_A$) and the first calculated emergency code ($eN_{X1}$) as a first emergency request code ($eR_{1a}$); and transmitting a first emergency request code ($eR_{1a}$) to the inquiry end (B);

a second emergency inquiry step (P2$b'$) performed by the inquiry end (B), the second emergency inquiry step (P2$b'$) including the operations of:

generating a second arbitrary emergency code ($eN_{b1}$) having a second present value;

performing an XOR operation between the second arbitrary emergency code ($eN_{b1}$) and the inquiry key ($K_B$) to generate a second calculated emergency code ($eN_{y1}$);

setting a value of the hash function of a combined data of the first emergency request code ($eR_{1a}$), the inquiry key ($K_B$), the second arbitrary emergency code ($eN_{b1}$) and the second identification code ($SID_B$) as a first emergency tested code ($eV_1'$);

combining the first emergency request code ($eR_{1a}$), the second identification code ($SID_B$), the first emergency tested code ($eV_1'$) and the second calculated emergency code ($eN_{y1}$) as a second emergency request code ($eR_{1b}$); and transmitting the second emergency request code ($eR_{1b}$) to the receiving end (C);

a first emergency answering step (P3$a'$) performed by the receiving end (C), the first emergency answering step (P3$a'$) including the operations of:

performing an XOR operation between the request key ($K_A$) and the first calculated emergency code ($eN_{X1}$) to generate a third arbitrary emergency code ($eN_{a2}$) having the first preset value of the first arbitrary emergency code ($eN_{a1}$);

performing an XOR operation between the inquiry key ($K_B$) and the second calculated emergency code ($eN_{y1}$) to generate a fourth arbitrary emergency code ($eN_{b2}$) having the second present value of the second arbitrary emergency code ($eN_{b1}$);

verifying the first emergency tested code ($eV_1'$) with a determined value of the hash function of a combined data of the first emergency request code ($eR_{1a}$), the inquiry key ($K_B$), the fourth arbitrary emergency code ($eN_{b2}$) and the second identification code ($SID_B$);

wherein, if the one-time alias identity ($eAID_A$) is verified to contain the other one of the plurality of pseudo identification codes ($pid_j$) and if the first emergency tested code ($eV_1'$) is verified to be correct, the first emergency answering step (P3$a'$) further includes the operations of:

generating a first secret authentication key ($eCK_1$);

performing an XOR operation between the first secret authentication key ($eCK_1$) and a value of the hash function of a combined data of the request key ($K_A$) and the first identification code ($SID_A$) to generate a first calculated emergency verification code ($eN_{X1}'$);

performing an XOR operation between the first secret authentication key ($eCK_1$) and a value of the hash function of a combined data of the inquiry key ($K_B$) and the fourth arbitrary emergency code ($eN_{b2}$) to generate a second calculated emergency verification code ($eN_{y1}'$);

setting a value of the hash function of a combined data of the second calculated emergency verification code ($eN_{y1}'$), the fourth arbitrary emergency code ($eN_{b2}$), the inquiry key ($K_B$) and the second identification code ($SID_B$) as a second emergency tested code ($eV_2'$);

increasing the value of the variable (em) by the increment;

setting the value of the variable (em) as a first new emergency registration code ($eTs_{a1-new}$);

performing an XOR operation between the first new emergency registration code ($eTs_{a1-new}$) and a value of the hash function of a combined data of the request key ($K_A$), the first identification code ($SID_A$) and the third arbitrary emergency code ($eN_{a2}$) to generate a final emergency registration code ($eTs$);

setting a value of the hash function of a combined data of the first calculated emergency verification code ($eN_{X1}'$), the third arbitrary emergency code ($eN_{a2}$), the final emergency registration code ($eTs$), the request key ($K_A$) and the first identification code ($SID_A$) as a third emergency tested code ($eV_3'$);

setting a value of the hash function of a combined data of the inquiry key ($K_B$), the fourth arbitrary emergency code ($eN_{b2}$) and the second identification code ($SID_B$) as a first new emergency inquiry key ($eK_{B1-new}$);

generating a first new emergency request key ($eK_{A1-new}$);

performing an XOR operation between the first new emergency request key ($eK_{A1-new}$) and a value of the hash function of a combined data of the identification code ($SID_A$) and the request key ($K_A$) to generate an emergency registration code (x);

updating the request key ($K_A$) with the first new emergency request key ($eK_{A1-new}$);

combining the first calculated emergency verification code ($eN_{X1}'$), the second calculated emergency verification code ($eN_{y1}'$), the second emergency tested code ($eV_2'$), the third emergency tested code ($eV_3'$), the final emergency registration code (eTs) and the emergency registration code (x) as a first emergency response code ($eR_{2a}$); and transmitting the first emergency response code ($eR_{2a}$) to the inquiry end (B);

a second emergency answering step (P3b') performed by the inquiry end (B) if the second emergency tested code ($eV_2'$) is verified to be correct using a determined value ($eV_{2-chk}'$) of the hash function of a combined data of the second calculated emergency verification code ($eN_{y1}'$), the second arbitrary emergency code ($eN_{b1}$), the inquiry key ($K_B$) and the second identification code ($SID_B$), the second emergency answering step (P3b') including the operations of:

performing an XOR operation between the second calculated emergency verification code ($eN_{y1}'$) and a value of the hash function of a combined data of the inquiry key ($K_B$) and the second arbitrary emergency code ($eN_{b1}$) to generate a second secret authentication key ($eCK_2$);

setting a value of the hash function of a combined data of the inquiry key ($K_B$), the second arbitrary emergency code ($eN_{b1}$) and the second identification code ($SID_B$) as a second new emergency inquiry key ($eK_{B2-new}$);

updating the inquiry key ($K_B$) with the second new emergency inquiry key ($eK_{B2-new}$);

combining the first calculated emergency verification code ($eN_{X1}'$), the third emergency tested code ($eV_3'$) and the final emergency registration code (eTs) as a second emergency response code ($eR_{2b}$); and transmitting the second emergency response code ($eR_{2b}$) to the requesting end (A); and an emergency verification step (P4') performed by the requesting end (A) if the third emergency tested code ($eV_3'$) is verified to be correct using a determined value ($eV_{3-chk}'$) of the hash function of a combined data of the first calculated emergency verification code ($eN_{X1}'$), the first arbitrary emergency code ($eN_{a1}$), the final emergency registration code (eTs), the request key ($K_A$) and the identification code ($SID_A$), the emergency verification step (P4') including the operations of:

performing an XOR operation between the first calculated emergency verification code ($eN_{X1}'$) and a value of the hash function of a combined data of the request key ($K_A$) and the identification code ($SID_A$) to generate a third secret authentication key ($eCK_3$);

performing an XOR operation between the final emergency registration code (eTs) and a value of the hash function of a combined data of the request key ($K_A$), the identification code ($SID_A$) and the first arbitrary emergency code ($eN_{a1}$) to generate a second new emergency registration code ($eTs_{a2-new}$);

performing an XOR operation between the emergency registration code (x) and a value of the hash function of a combined data of the identification code ($SID_A$) and the request key ($K_A$) to generate a second new emergency request key ($eK_{A2-new}$);

updating the request key ($K_A$) with the second new emergency request key ($eK_{A2-new}$); and updating the preliminary registration code ($Ts_a$) with the second new emergency registration code ($eTs_{a2-new}$).

6. The authentication method for the communication network as claimed in claim 5, wherein each of the first identification code ($SID_A$) and the second identification code ($SID_B$) is a communication key, a signature, a certificate or a license.

7. The authentication method for the communication network as claimed in claim 5, wherein the preliminary registration code ($Ts_a$) is a series of numbers arranged in a descending or ascending order.

8. The authentication method for the communication network as claimed in claim 5, wherein the pseudo identification code ($pid_j$) is a random number of a timestamp.

* * * * *